United States Patent
Willenegger et al.

(10) Patent No.: US 7,035,284 B2
(45) Date of Patent: Apr. 25, 2006

(54) METHOD AND APPARATUS FOR REDUCING INTER-CHANNEL INTERFERENCE IN A WIRELESS COMMUNICATION SYSTEM EMPLOYING A NON-PERIODIC INTERLEAVER

(75) Inventors: Serge Willenegger, Onnens (CH); Durga P. Malladi, San Diego, CA (US); Josef J. Blanz, Munich (DE)

(73) Assignee: Qualcomm Incorporated, San Diego, CA (US)

(*) Notice: Subject to any disclaimer, the term of this patent is extended or adjusted under 35 U.S.C. 154(b) by 720 days.

(21) Appl. No.: 10/118,722

(22) Filed: Apr. 8, 2002

(65) Prior Publication Data

US 2003/0174676 A1 Sep. 18, 2003

Related U.S. Application Data

(60) Provisional application No. 60/364,442, filed on Mar. 14, 2002.

(51) Int. Cl.
*H04J 3/16* (2006.01)
*H04J 3/22* (2006.01)

(52) U.S. Cl. .................. 370/470; 370/471; 370/444
(58) Field of Classification Search ................ 370/320, 370/321, 324, 350, 335, 336, 342, 345, 347, 370/468, 470, 471, 473, 444; 714/756, 699, 714/776; 711/5, 127, 157
See application file for complete search history.

(56) References Cited

U.S. PATENT DOCUMENTS

| 5,101,501 | A | | 3/1992 | Gilhousen et al. |
| 6,122,294 | A | * | 9/2000 | Hsu et al. ................ 370/477 |
| 6,735,240 | B1 | * | 5/2004 | Kang ...................... 375/148 |

FOREIGN PATENT DOCUMENTS

| DE | 199 59 179 A1 | 6/2001 |
| EP | 0 465 144 A2 | 1/1992 |
| EP | 0 851 620 A2 | 7/1998 |
| EP | 1 154 577 A1 | 11/2001 |
| WO | 00/49780 | 8/2000 |
| WO | 01/41314 A1 | 6/2001 |

* cited by examiner

*Primary Examiner*—Wellington Chin
*Assistant Examiner*—Raj Jain
(74) *Attorney, Agent, or Firm*—Philip Wadsworth; Thien Nguyen; Kam Tam

(57) ABSTRACT

Method and apparatus for reducing interference in a wireless communication system when the source of interference is a deterministic component of the system. In one embodiment, the receiver weights the transmitters according to when the source of interference is transmitted. Further, the transmitter may employ power boosting to overcome the source of interference. In one embodiment, a W-CDMA system transmits a sync channel concurrently with physical channels, wherein the sync channel is not orthogonal to the physical channels. The receiver may cancel the sync channel when receiving control or data information. Similarly, the receiver may weight the transmissions from multiple transmitters.

10 Claims, 14 Drawing Sheets

| DPCH SF | TYPICAL WORST CASE SNR DUE TO SCH INTERFERENCE ES/N$_{SCH}$ [dB] |
|---|---|
| 256 | 9.5 dB |
| 128 | 7.5 dB |
| 64 | 6.5 dB |
| 32 | 5 dB |
| 16 | 3.5 dB |
| 8 | 0.5 dB |
| 4 | 0 dB |

FIG. 4

| | CLASS A | CLASS B | CLASS C | DCCH |
|---|---|---|---|---|
| BITS | 81 | 103 | 60 | 148 |
| CODE RATE | 1/3 | 1/3 | 1/2 | 1/3 |
| CRC | 12 | 0 | 0 | 16 |
| RM ATTRIBUTES | 200 | 190 | 235 | 160 |
| EFFECTIVE CODE RATE | 0.323718 | 0.338415 | 0.4096386 | 0.401869 |

FIG. 11

| TRANSPORT CHANNEL TYPE/TF | SNR FOR 1%BLER |
|---|---|
| CLASS A / 1 x 81 BITS (FULL RATE) | 2.9 dB |
| CLASS A / 1 x 39 BITS (SID) | 1.5 dB |
| CLASS A / 1 x 0 BITS (NULL) | 0.5 dB |
| DCCH/1 x 148 BITS | 3.3 dB |

FIG. 12

| TRANPORT FORMAT COMBO | CLASS A REQUIREMENT | DCCH REQUIREMENT | OVERALL REQUIREMENT: MAX{CLASS A, DCCH} |
|---|---|---|---|
| CLASS A : 1 x 81 DCCH : 0 x 148 | 20 dB | - | 2.0 dB |
| CLASS A : 1 x 39 DCCH : 0 x 148 | 1.5 dB | - | 1.5 dB |
| CLASS A : 1 x 0 DCCH : 0 x 148 | 0.5 dB | - | 0.5 dB |
| CLASS A : ANY DCCH : 1 x 148 | 2.0, 1.5, OR 0.5 dB | 3.3 dB | 3.3 dB |

FIG. 13

METHOD AND APPARATUS FOR REDUCING INTER-CHANNEL INTERFERENCE IN A WIRELESS COMMUNICATION SYSTEM EMPLOYING A NON-PERIODIC INTERLEAVER

CLAIM OF PRIORITY UNDER 35 U.S.C. §119(e)

The present Application for Patent claims priority to U.S. Provisional Application No. 60/364,442, filed Mar. 14, 2002, assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"METHOD AND APPARATUS FOR REDUCING INTERFERENCE IN A WIRELESS COMMUNICATION SYSTEM," by WILLENEGGER et al., having U.S. application Ser. No. 10/118,691, filed concurrently herewith, assigned to the assignee hereof, and expressly incorporated by reference herein; and "METHOD AND APPARATUS FOR REDUCING INTER-CHANNEL INTERFERENCE IN A WIRELESS COMMUNICATION SYSTEM," by WILLENEGGER et al., having U.S. application Ser. No. 10/118,686, filed concurrently herewith, assigned to the assignee hereof, and expressly incorporated by reference herein.

BACKGROUND

1. Field

The present invention relates to wireless communication systems generally and specifically, to methods and apparatus for reducing interference in a wireless communication.

2. Background

There is an increasing demand for packetized data services over wireless communication systems. In a system such as Wideband Code Division-Multiple Access (W-CDMA), various channels are multiplexed together and transmitted on a single physical channel. In parallel, various other channels, such as the sync channel, etc., are transmitted over a common air link. The channels may introduce interference to each other in a given situation. For example, as the sync channel is not constrained to be orthogonal to other physical channels, the sync channel may introduce interference to the other channels.

There is a need, therefore, for a method of reducing the inter-channel interference of a wireless communication system.

BRIEF DESCRIPTION OF THE DRAWINGS

FIG. 4 is a structure of a Synchronization Channel (SCH) in a wireless communication system employing W-CDMA.

FIG. 11 illustrates coding of Adaptive Multi-Rate/Dedicated Control Channel (AMR/DCCH) transport channels.

FIG. 12 illustrates simulated SNR values required by various transport formats.

FIG. 13 illustrates SNR requirements for various Transport Format Combinations (TFCs).

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Note that the exemplary embodiment is provided as an exemplar throughout this discussion; however, alternate embodiments may incorporate various aspects without departing from the scope of the present invention. Specifically, the various embodiments are applicable to a data processing system, a wireless communication system, a mobile IP network and any other system desiring efficient use and management of resources.

The exemplary embodiment employs a spread-spectrum wireless communication system employing Wideband-Code Division-Multiple Access (W-CDMA). Wireless communication systems are widely deployed to provide various types of communication such as voice, data, and so on. These systems may be based on Code Division-Multiple Access (CDMA), Time Division Multiple Access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the cdma2000 standard of protocols. Alternate embodiments may incorporate another standard.

A W-CDMA system is described in the set of specification documents defined by 3GPP having address given as ETSI Mobile Competence Centre, 650, Route des Lucioles, 06921 Sophia-Antipolis Cedex, France.

Figure 1:
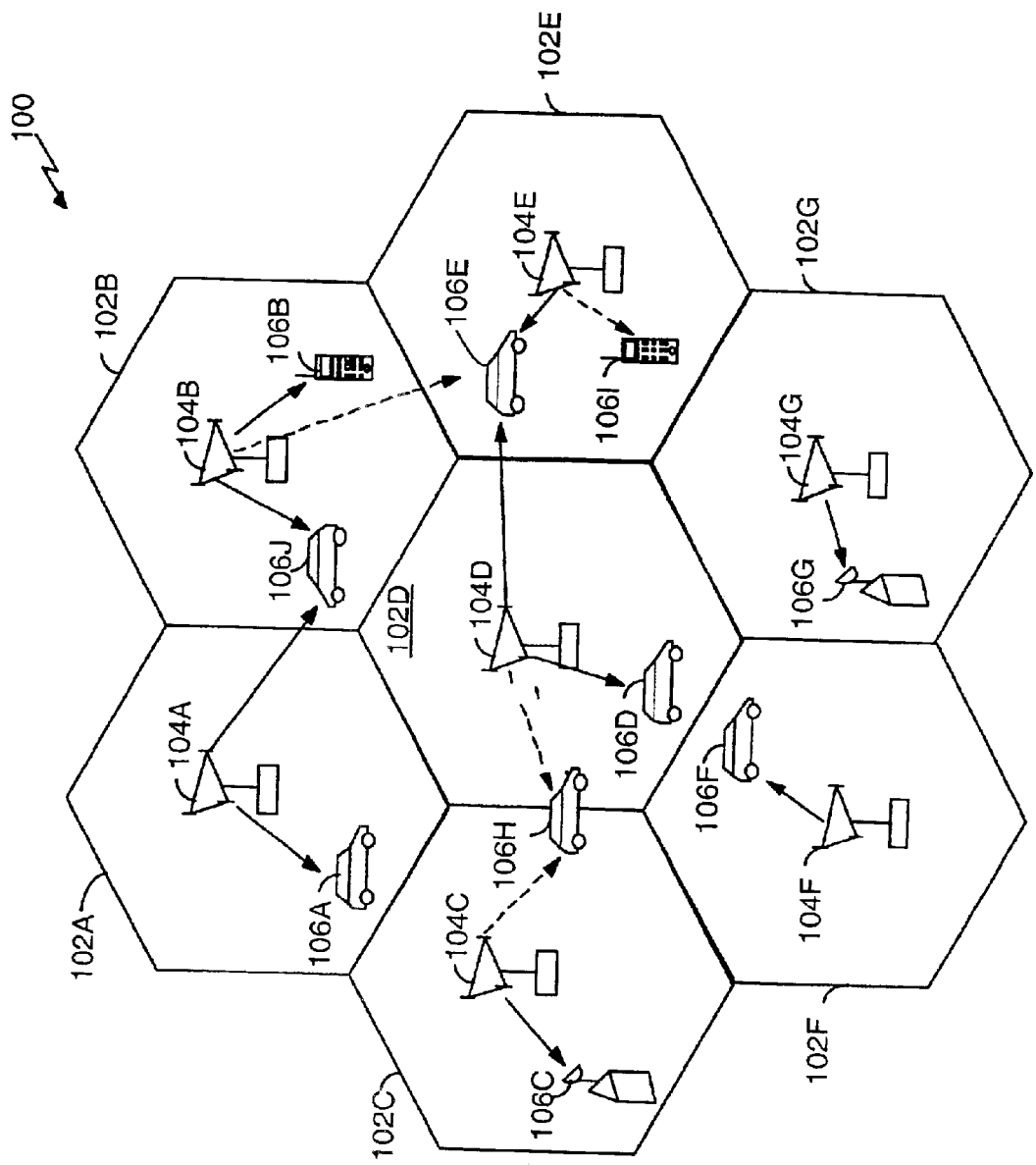
FIG. 1 is a wireless communication system.

FIG. 1 serves as an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A–102G, each of which is serviced by a corresponding base station 104A–104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, a base station 104 may have multiple transmit antennas and a single receive antenna, or may have multiple receive antennas and a single transmit antenna, or may utilize single antennas for both receive and transmit, or may utilize multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM," which is assigned to the assignee of the present invention.

A W-CDMA system is provided as the exemplar for the present discussion. Note that in a W-CDMA system the base station is referred to as a Node-B, and the mobile station is referred to as the User Equipment (UE). Alternate embodiments may employ alternate communication systems wherein various channels may present interference to other channels in the system. In the W-CDMA system specifically, channels are coded and transmitted over a same air interface, wherein at least one of the channels is non-orthogonal to the other channels. In a spread spectrum system, the orthogonality of the channels avoids inter-channel interference. Therefore, the presentation of a non-orthogonal channel incurs a potential problem for inter-channel interference. However, the present invention is applicable to other systems, wherein one or more channels present interference to other channels.

Returning to FIG. 1, the downlink refers to transmission from the base station 104 to the terminal 106, and the uplink refers to transmission from the terminal 106 to the base station 104. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Figure 2:
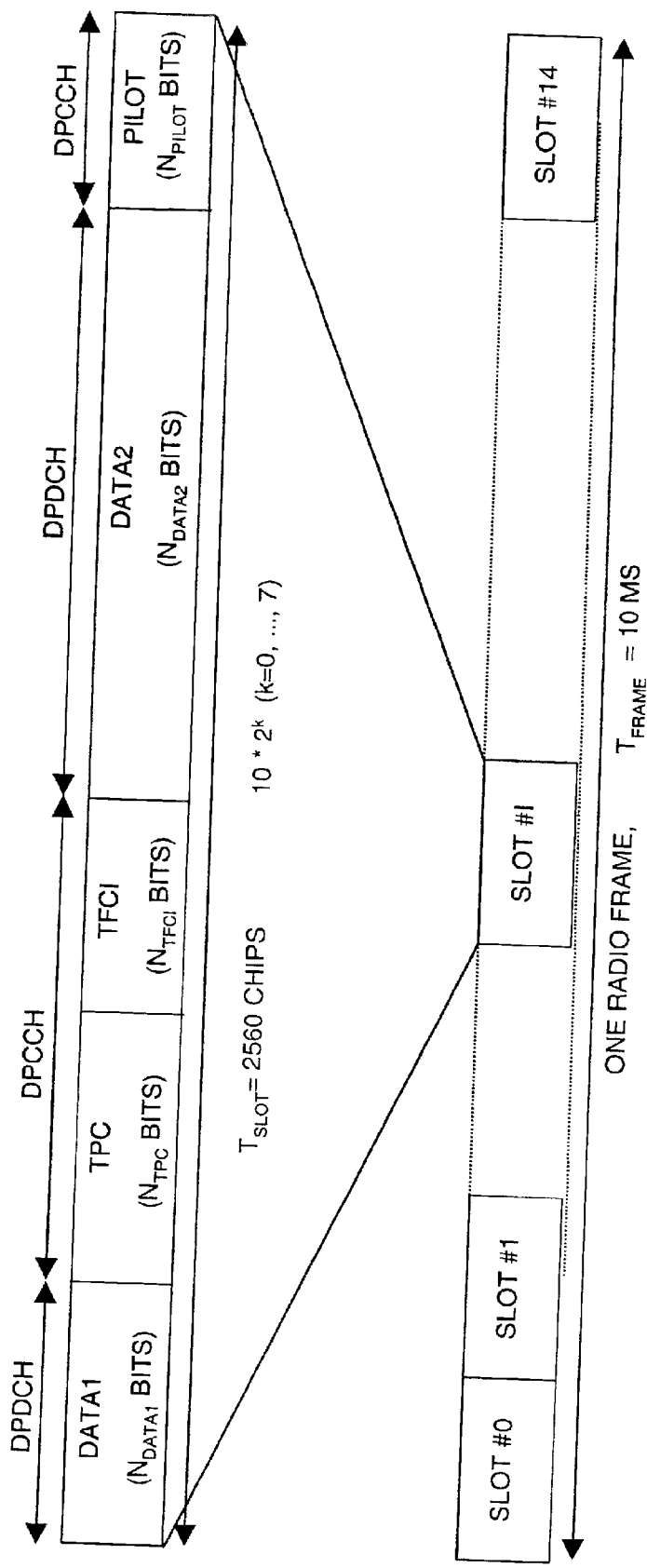
FIG. 2 is a frame structure for a downlink physical channel in a wireless communication system employing W-CDMA.

FIG. 2 illustrates a downlink dedicated physical channel, the Downlink Dedicated Physical Channel (downlink DPCH) in a W-CDMA system. Multiple logical channels referred to as Transport Channels (TrCHs) are multiplexed to form one physical channel, i.e., DPCH. In other words, within one downlink DPCH, dedicated data generated at higher layers are multiplexed together. The dedicated transport channel (DCH) is transmitted in time-multiplex with control information, such as known pilot bits, Transmit Power Control (TPC) commands, and an optional Transport Format Combination Indicator (TFCI). The downlink DPCH therefore may be seen as a time multiplex of a downlink Dedicated Physical Data Channel (DPDCH) and a downlink Dedicated Physical Control Channel (DPCCH).

FIG. 2 illustrates the frame structure of the downlink DPCH. Each frame of length 10 ms is split into 15 slots, each of length $T_{SLOT}$=2560 chips, corresponding to one power-control period. As illustrated, the DPDCH portions alternate with DPCCH portions. In the example, a slot includes a first DPDCH portion of $N_{DATA1}$ bits of DATA1, followed by a DPCCH portion having $N_{TPC}$ bits of TPC and $N_{TFCI}$ bits of TFCI. The next portion is a DPDCH portion of DATA2 having $N_{DATA2}$ bits. The final portion is a DPCCH portion of PILOT having $N_{PILOT}$ bits.

The parameter k determines the total number of bits per downlink DPCH slot. The parameter k is related to the Spreading Factor (SF) of the physical channel, wherein SF=$512/2^k$. The spreading factor may thus range from 512 down to 4.

Figure 3:
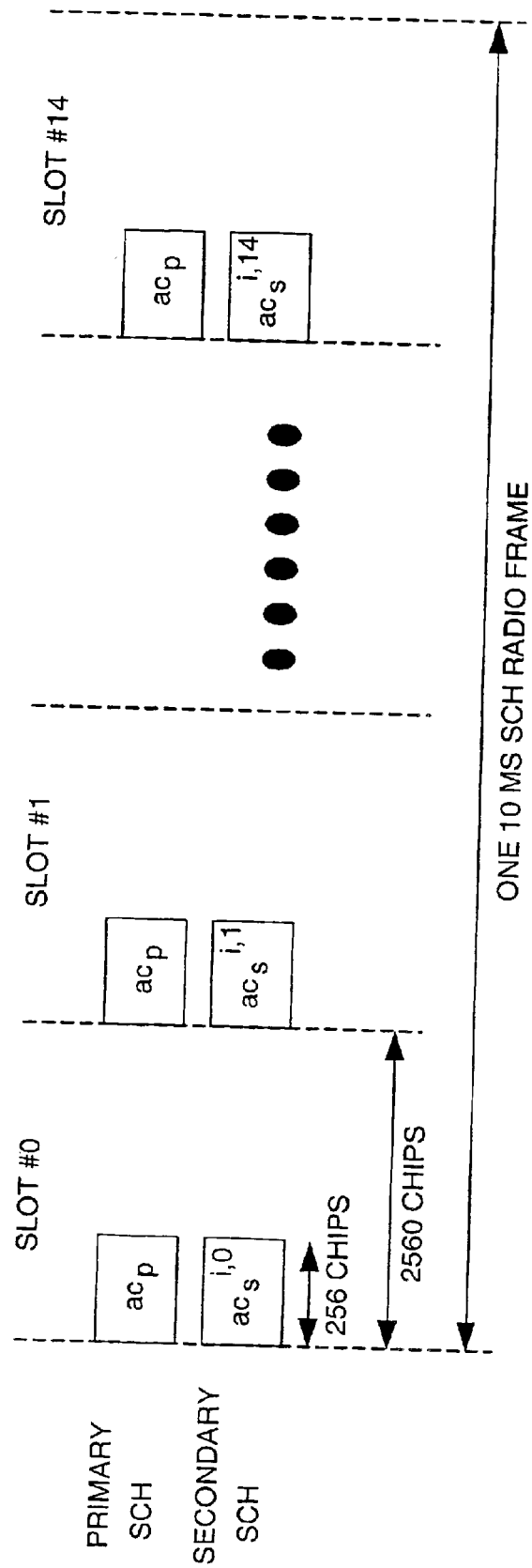
FIG. 3 is a frame structure for a downlink physical control channel in a wireless communication system employing W-CDMA.

Also transmitted within the W-CDMA system is a synchronization sequence on a Synchronization Channel (SCH). Note that the synchronization sequence may be referred to as a synchronization message. As detailed in 3GPP TS 25.211, Section 5.3.3.5, the SCH is specified as nonorthogonal to the other channels and to DPCH specifically. The SCH is a downlink signal used by the UE for cell search. The SCH consists of two sub channels, the Primary and Secondary SCH. The 10 ms radio frames of the Primary and Secondary SCH are divided into 15 slots, each of length 2560 chips. FIG. 3 illustrates the structure of the SCH radio frame. The Primary SCH consists of a modulated code of length 256 chips, the Primary Synchronization Code (PSC) denoted $c_p$, which is transmitted once each slot. The PSC is the same for each cell in the system.

The Secondary SCH consists of a repeated transmission of 15 consecutive sequences of modulated codes of length 256 chips, the Secondary Synchronization Codes (SSC), which are transmitted in parallel with the Primary SCH. The SSC is denoted $c_s^{i,k}$ in FIG. 3; wherein i=0, 1, . . . , 63 and represents the number of the scrambling code group; and wherein k=0, 1, . . . , 14 and represents the slot number. Each SSC is chosen from a set of 16 different codes of length 256. This sequence on the Secondary SCH indicates to which of the code groups the cell's downlink scrambling code belongs. Note that the synchronization message is transmitted at a predetermined position within each slot. In this way, the synchronization message has a known occurrence.

Hereinbelow are described various aspects of the WCDMA system which when put together may lead to the problems discussed hereinabove. Specifically, the following discussion covers the interaction of the SCH and the DPCH, interleaving and channel mapping, reference configurations, power control and the specific weaknesses in the Layer 2 (L2) ACKnowledge (ACK) message. Note that similar inter-channel interference may result from other channels, but the SCH is described as an exemplar.

DPCH and SCH Interaction

With respect to DPCH and SCH interaction, the SCH is a special signal comprising two 256 chip sequences: the primary SCH (PSCH), and the secondary SCH (SSCH). The two sequences are transmitted in parallel during each slot on the downlink transmission. The SCH is transmitted with a 10% duty cycle within each slot. The SCH is primarily used by the terminal, or UE, to acquire the system timing and help identify the cell which the UE may acquire. In other words, the SCH reduces the number of hypotheses made by the UE during cell identification.

Although the primary and secondary synchronization codes (PSC, SSC) structures, as described in 3GPP TS 25.213, are not orthogonal, they are designed to provide maximum isolation between the sync channel and the other downlink channels. The isolation depends on the spreading factor of the DPCH under consideration as well as the scrambling code segment covering the particular symbol.

FIG. 4 illustrates the worst case coded bit Signal-to-Noise Ratio (SNR) due to the SCH interference in dB. The results illustrated in FIG. 4 assume equal power for transmission of the SCH and DPCH (different values reflect different SSC and DPCH OVSF code indices). The left column indicates the DPCH Spreading Factor (SF). The right column indicates the worst case SNR due to SCH interference to the DPCH. Note that the SNR bound will generally not improve when considering multi-path or transmit-diversity techniques as the SCH interference is deterministic and fully correlated (i.e. not Average White Gaussian Noise (AWGN)). The median SNR for the non-orthogonal cases (around 50% of the combinations yield orthogonal SCH relative to the DPCH) is typically 5 dB higher than the worst case SNR.

The SNR bound may become the limiting factor when considering high geometries. High geometry refers to the ratio of the total power received from the target cell to the total power received from all cells. The total power includes interference, both introduced by the environment and by other transmission channels. The closer a UE is to a Node-B, the higher the geometry. Note that typically channels within a cell are orthogonal (with the exception of special channels such as the SCH); however, from cell to cell channels are not necessarily orthogonal. In this way, for a high geometry position, the UE only sees orthogonal channels as proximate the Node-B. The interference presented by a non-orthogonal channel, such as the SCH, is pronounced. In contrast, for a low geometry position, the UE sees a lot of non-orthogonal interference as far from the Node-B. The SCH channel is not as pronounced at low geometry as the power of the SCH is added to the other interference making little difference. Coupled with the consideration that the SCH is transmitted at a same power level constantly, but the dedicated channel is transmitted according to the position of the UE, the SCH has a greater impact at higher geometries.

The Universal Mobile Telecommunications System (UMTS) multiplexing and interleaving scheme is described in 3GPP TS 25.212. Various transport channels are first coded and interleaved separately on a per Transmission Time Interval (TTI) basis. Then the channels are multiplexed on a radio frame by radio frame basis, interleaved and mapped onto the physical channel payload. The transport channel mapping may be according to the fixed or flexible position rule.

Figure 5:
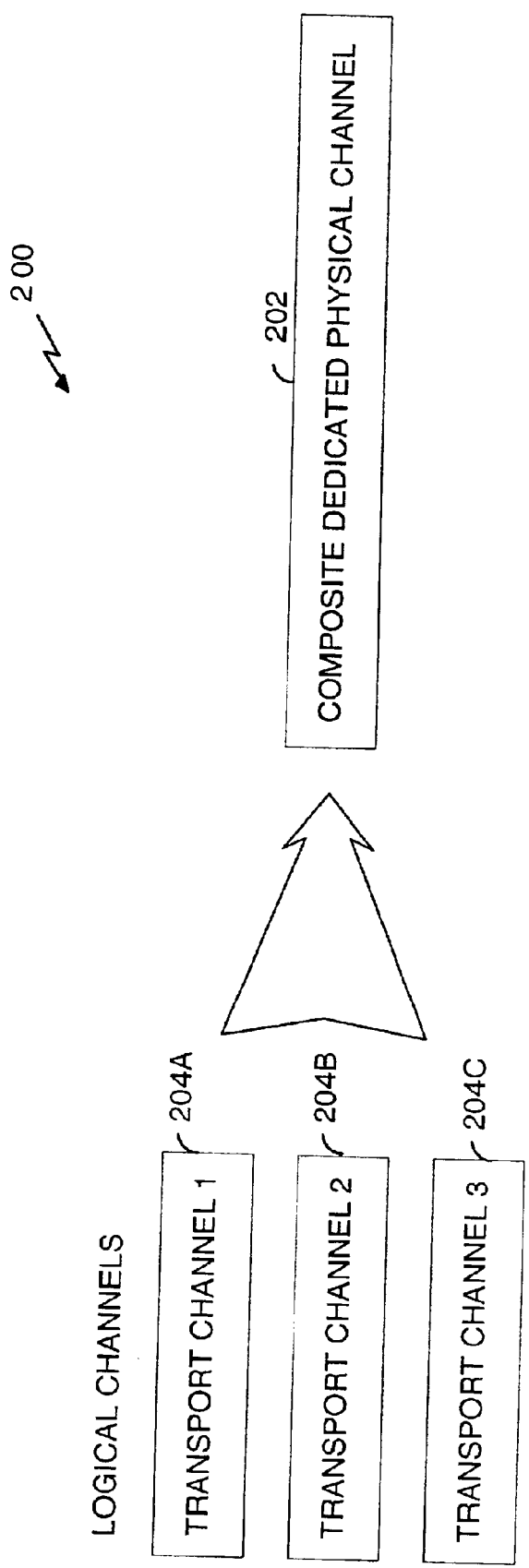
FIG. 5 is a table illustrating the Signal-to-Noise Ratio (SNR) associated with various codings due to SCH interference.

FIG. 5 illustrates the mapping of multiple logical channels onto a common physical channel. The logical channels are illustrated as transport channel 1 204A, transport channel 2 204B, and transport channel 3 204C. The three transport channels 204A, 204B, 204C are mapped to a physical channel 202. The bits of each channel are interleaved separately. Note that in a W-CDMA system each frame includes 15 slots, wherein each slot includes 2560 chips. The data information is time multiplexed with control information which is provided at known intervals.

The interleaving involves two steps considering a $1^{st}$ interleaver and a $2^{nd}$ interleaver. A potential problem exists when the structure of the $1^{st}$ interleaver (detailed below) is such as to cause the problem to repeat each radio frame in the TTI. Further, the structure of the $2^{nd}$ interleaver and the associated periodicity is similar to the slot periodicity of the physical channel, and therefore, the SCH periodicity is another potential factor leading to the SCH interference issues.

Figure 6:
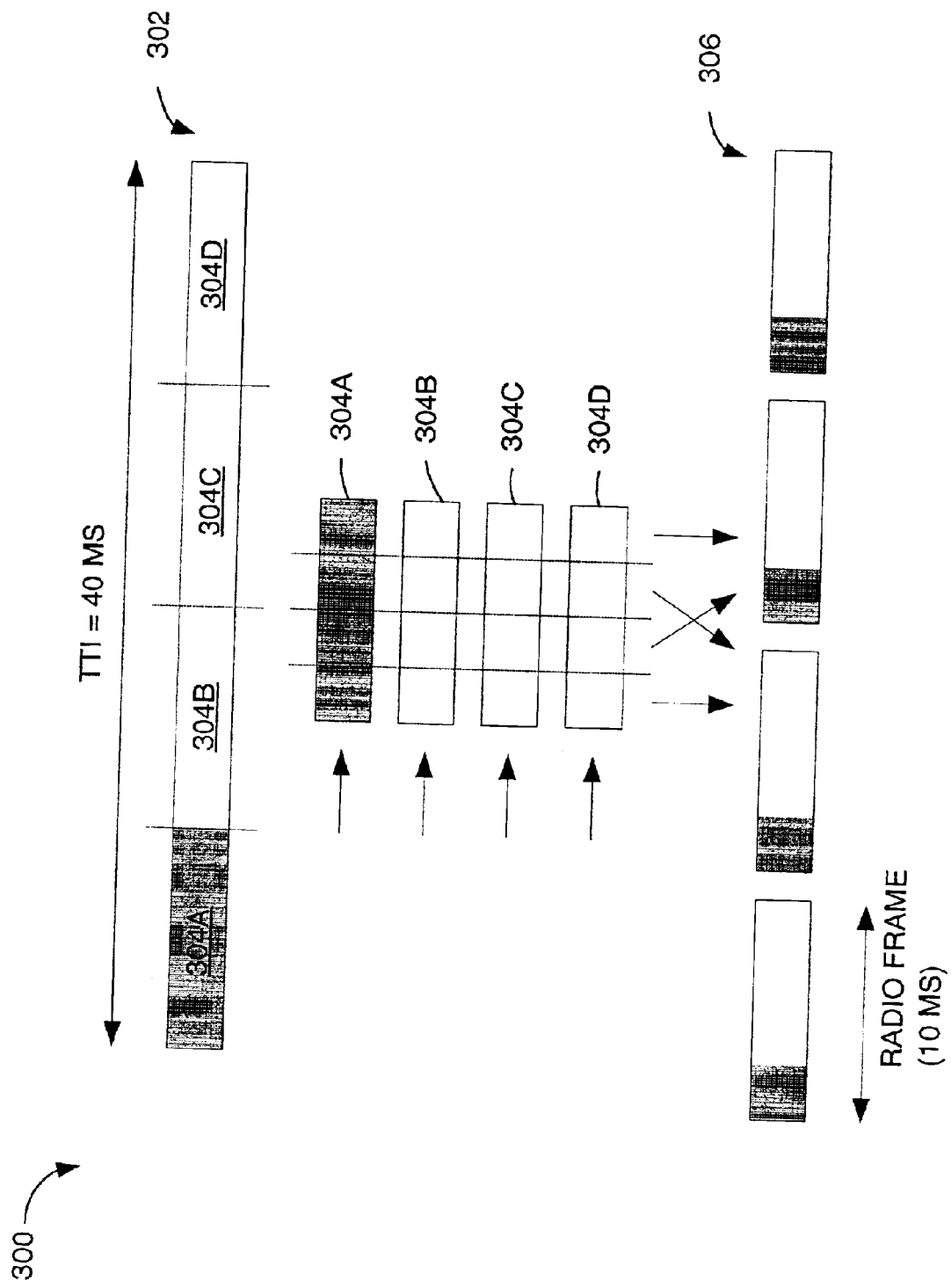
FIGS. 6 and 7 illustrate interleaving in a W-CDMA system.

FIG. 6 illustrates the $1^{st}$ interleaving procedure 300 with radio frame segmentation assuming a 40 ms TTI. The $1^{st}$ interleaving procedure essentially ensures that the TTI bits are spread across multiple radio frames. The $1^{st}$ interleaving procedure, however, does not affect the relative position of the bits within each radio frame compared to their relative position in the transport block as can be seen by the position of the gray areas in FIG. 6. As illustrated, a TTI of 40 msec includes four frames of 10 msec each. The TTI is identified as TTI 302. The frames are identified as frames 304A, 304B, 304C, and 304D. Each frame is then divided into four portions. The frame division is consistent with the number of frames per TTI. The portions of the frames are then interleaved together to form the radio frame stream 306. The shaded portion identies the processing of a TTI frame 304A. The interleaving procedure 300 involves writing the TTI frames row by row, and then reading the frame portions column by column. The order of the interleaved portions is predetermined and predictable.

Figure 7:
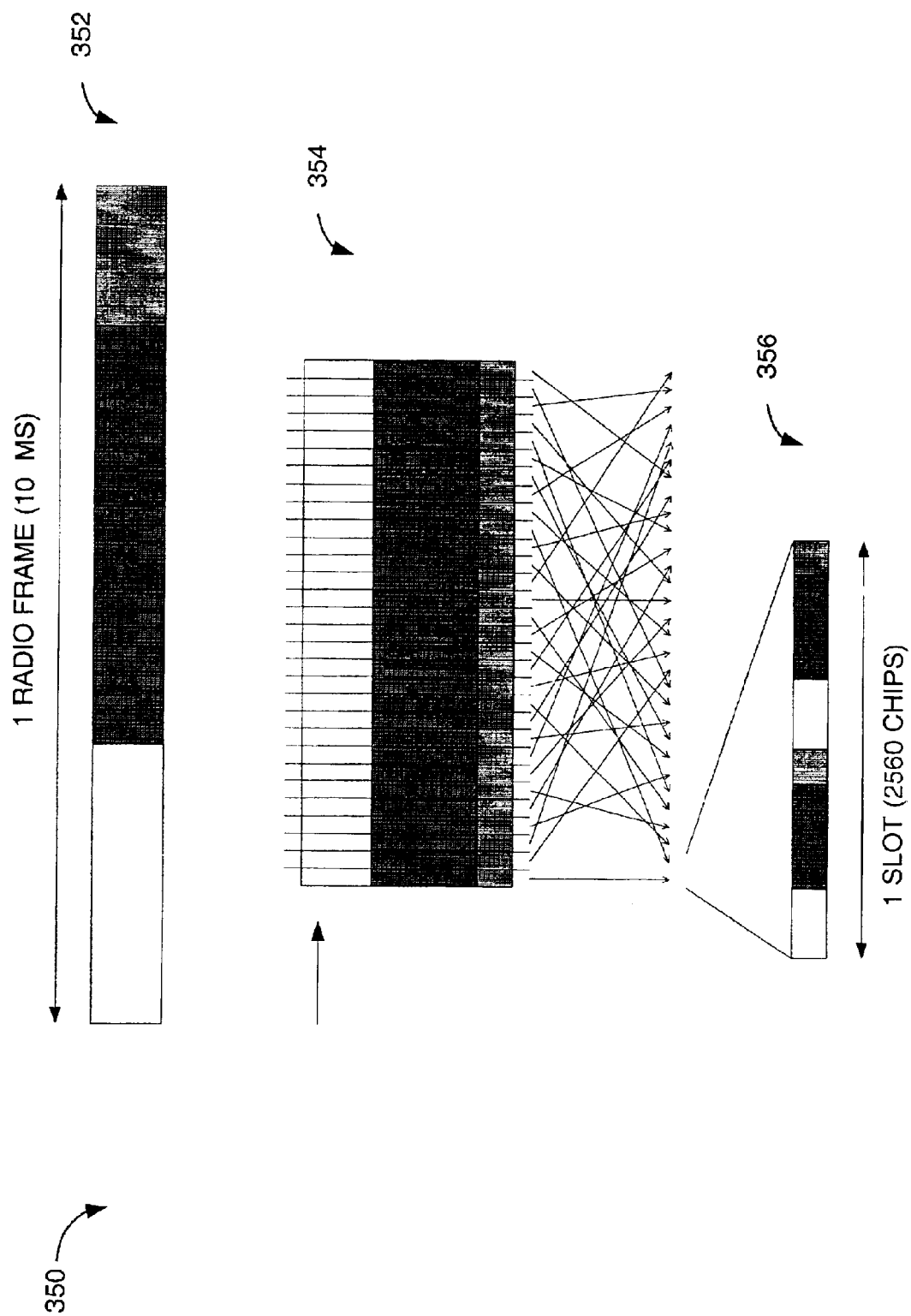

The interleaving procedure 350 of the $2^{nd}$ interleaver is illustrated in FIG. 7 for three transport channels. The interleaver is based on a 30 column matrix, wherein the number of columns is consistent with the number of slots per frame. From the radio frame 352, each frame is divided into 30 portions to form a matrix 354. The portions are then interleaved to form the final interleaved stream 356. The $2^{nd}$ interleaver ensures that some information from each transport channel appears in each slot. The $2^{nd}$ interleaver, however, does not change the relative position of each transport channel's information within each slot, with the exception that the periodicity of appearance of each transport channel is twice as high (3000 Hz) as the periodicity of the slot (1500 Hz). Nevertheless if a periodic interference such as that generated by the SCH, were to last as long or longer than the transmission interval of a given transport channel in a given slot, the interference would affect half of the symbols of the particular transport channel.

The order in which the transport channels are mapped on the physical channel affect the absolute position of each transport channel but not the periodicity of appearance of data from each transport channel which is always 3000 Hz. Further, the mapping order does not affect the fact that a particular transport channel information always appear in the same position within the slot.

Variable position mapping results in having a particular transport channel information appear in a different position for each combination of transport channel information elements (Transport Format Combination or TFC) whereas fixed position ensures that irrespective of the TFC the transport channel information will always appear in the same position within a slot. Consequently, the mapping position does not alleviate the periodic SCH interference issue.

Reference Configuration for DCCH

In simulation results, a given transport channel may be affected by the SCH interference as a function of the position of that channel within the transport channel multiplexing structure. Up to half of the symbols in a given transport channel may be affected by the SCH interference. This worst case condition occurs when the rate of the transport channel is low relative to the other transport channels which are multiplexed together. In particular, if the relative size of the transport channel is less than 10% and the transport channel is an end channel, i.e., the first or the last channel to be multiplexed, then for certain frame offset half of the transport channel symbols will be affected by the SCH.

Note that for an interleaving process wherein the data is provided at varying locations within each lot, the problems of inter-channel interference are not as severe. The varying location of data means that not all occurrences of the data will interfere with the non-orthogonal channel. In W-CDMA, however, the data is consistently transmitted at the same position within a slot.

Therefore, inter-channel interference presents a pronounced problem. The inter-channel interference may become a problem in alternate type systems, particularly, wherein the data or control information is provided during a consistent position in each slot.

Considering the reference channel configurations described in 3GPP TS 34.108, the Dedicated Control Channel (DCCH) appears to be the lowest rate channel in most configurations and may therefore be the one suffering the most from SCH interference. Table 1 below shows the relative size of the DCCH for various configurations on a per radio frame basis.

TABLE 1

| REFERENCE CONFIGURATION | RELATIVE DCCH PAYLOAD OCCUPANCY |
|---|---|
| DL 12.2 + 3.4 (kbps) | ~20.0% |
| DL 64 + 3.4 (kbps) | ~5.0% |
| DL 384 + 3.4 (kbps) | ~0.9% |

The reference configurations include a first transmission rate for the data followed by a second transmission rate for the DCCH. For example, in the first row the Down Link (DL) defines the DCH data rate of 12.2 kbps with a DCCH rate of 3.4 kbps. The first row refers to voice communication; the second row refers to video; and the third row refers to packet data communication. The relative DCCH payload occupancy is calculated as the DCCH rate divided by the combined rates of data plus DCCH. As an example, for the voice communication defined in the first row, the occupancy rate is determined as:

Occupancy=$DCCH$ rate/data rate+$DCCH$ rate)% or:

20%=3.4/(12.2+3.4)

The relative DCCH payload occupancy is driven by the most demanding TFC in the TFCS and not by the instantaneous TFC. For example, for the 384+3.4 case even if the instantaneous DTCH rate is 0 kbps the DCCH payload would still be 0.9% of total payload, wherein the rest are not transmitted, i.e., Discontinuous Transmission Mode or DTX.

The transmission of the SCH message on a non-orthogonal channel introduces interference to other channels, such as the DPCH. The DPCH carries data and control information, and therefore, when the SCH interferes with the control information, any of a variety of problems may result. As described hereinbelow, a particular problem is introduced when the SCH interferes with the transmission of the PILOT bits.

The inter-channel interference occurs due to the data (or control information) having the same periodicity as the sync information. The problem may be seen for any non-orthogonal channel transmitted within the system. The problem results in loss of data and control information, the incorrect power control of the system, and/or the increased use of power for transmissions within the system. Each of these issues is addressed hereinbelow. Note that many of these problems are mutually exclusive. For example, when the interference affects data there most likely will not be an effect on control as the control is transmitted at a different time.

The problem is not limited to the SCH, but may result in any non-orthogonal channel. The various solutions described hereinbelow assume that the interfering channel is a deterministic component of interference, and has a known transmission period. In the exemplary embodiment, the SCH transmission period is a multiple of slot periodicity. Further, in the exemplary embodiment, the interfering channel is transmitted once per frame or once per slot, and the presence of the interfering channel is identifiable by the receiver.

In effect, any channel that significantly overlaps other channels.

The various solutions are described hereinbelow and include, but are not limited to, the following concepts:
1. Outer Loop Target Based on Weakest Link;
2. Data scrambling (improve the coding robustness);
3. Avoid frame offsets which lead to SCH alignment with DCCH bits;
4. Non periodic interleaver;
5. Lower weighting of symbols impacted by SCH;
6. SCH suppression/cancellation; and
7. Power boosting.

For the particular issues discussed hereinabove, 1) and 2) will go a long way in ensuring that the DCCH can be received with the desired error rate by the UE. However, 1) and 2) do not address the source of the problem which is the SCH interference.

Outer Loop Power Control with Highest Quality of Service

The ultimate consequence associated with the SCH interference is the loss of the radio link, i.e., call is dropped. This is particularly likely if the network is configured in such a way as not to take into account the DCCH error rate when setting the DL DPCH power. Under such configuration, the network will not adjust the power allocation when the DCCH is affected by SCH interference and experiences a high error rate. Consequently the high error rate condition will subsist, the higher layer protocols will not be able to exchange messages with the required reliability and the radio link will eventually be dropped.

One embodiment seeks to resolve the problems associated with inter-channel interference by basing the outer loop power control mechanism on the quality of the DCCH. Note that each of the transport channels has a unique Quality Of Service (QOS) criteria. In this example, the QOS is defined by the BLER. This makes possible determination of the strictest QOS of all the transport channels and verifies that each channel satisfies the strictest requirement regardless of the individual requirements. In effect, the strictest requirement is applied to all transport channels.

Note that although each of the transport channels typically has a different QOS target (typically expressed in terms of data block error rate) they will experience a same symbol error rate in a given radio condition. However, when the SCH is added to the other channels, the DCCH symbols may be impacted and the DCCH symbol error rate may be higher than the symbol error rate of other transport channels. This is true when the sync message is transmitted at the same position in the slot with the control information. This results in a higher error rate for the DCCH.

In W-CDMA, even though the underlying physical channel symbol error is the same for all transport channels, the system may achieve different quality of service for each transport channel by adjusting the weight of each transport channel so as to achieve their respective selected transport channel block error rate.

In order to reduce the possibility that the radio link is dropped due to the DCCH experiencing high error rate conditions, the network may be configured in such a way that the DCCH error rate is considered in the power control procedure. In particular, the network may set a BLER target for the DCCH; the Radio Network Controller (RNC) may set a DCCH BLock Error Rate (BLER) target for the particular transport channel in the UE through Radio Resource Control (RRC) signaling as described in 3GPP TS 25.331. According to the 3GPP specification, the UE power control procedure ensures that each of the BLER targets set for each of corresponding transport channels is met, including the BLER target for the DCCH. Assuming the network has sufficient power to follow the power control commands received from the UE, use of the DCCH by the outer loop power control will avoid the effects of the inter-channel interference described earlier. In general, to set a BLER target on a particular transport channel the network ensures that all the conditions to enable BLER measurement on a transport channel are met as specified in 3GPP TS 5.215. For the particular case of DCCH, a Cyclical Redundancy Check (CRC) is attached to all DCCH transport blocks, including when no data is transmitted (i.e. a 0 bit block shall be defined for DCCH).

Note that while the use of the DCCH, or other transport channel impacted by the interfering channel, in the power control decision making process overcomes the results of the interference, such solutions may waste transmission power. The Node-B or transmitter may transmit using more power than is necessary. The increased power may lower the capacity of the system.

Time Offset of SCH

When a particular channel or set of channels are affected by the SCH interference more than the other transport channels with which they are multiplexed, the system may adjust the SCH to overlap with a selected transport channel that is considered insensitive or less sensitive to the interference. There are several possible ways to implement such a method to reduce the SCH overlap. Each uses knowledge of the frame offset, which is the relative timing between a DPCH radio frame boundary and the common pilot channel radio frame boundary in a cell.

In one embodiment, the system selects a DPCH frame offset such that the SCH does not interfere with the transport channels which may be sensitive to the SCH interference, in particular the DCCH. The frame offset selection occurs in the RNC for each downlink.

An alternate embodiment which may be used if the RNC has some constraints on the selection of the frame offset (for example due to the desire to distribute the DPCCH transmission in time) is to change the transport channel mapping order onto the physical channel. This again is controlled by the RRC in the RNC.

Each of these embodiments seeks to move the position of the transport channels so as to coordinate the occurrence of the interfering channel with a channel predicted to be the least sensitive to the interfering channel. Note that the Node-B sets up the dedicated channel(s), and therefore controls the timing of the dedicated channel(s), i.e., time offsets. Note this may require coordination of multiple Node-Bs when in soft handoff. The Node-B moves the offset for the dedicated channel based on the timing of the interfering channel, which in this case is the sync message channel, SCH.

Transport channels that are less sensitive to the interfering channel are typically those that cover a larger portion of the frame. As the SCH only uses 10% of the frame, a transport channel using less than or equal to 10% of the frame may completely overlap with the SCH transmission. In this case, the entire transport channel, i.e., information transmitted on that transport channel, will be overshadowed by the SCH. This information is at risk for loss due to the interference of the SCH.

It is further possible to change the order of the transport channels within the frame. As the SCH is transmitted at the same position(s) in each frame, changing the order of transmission of the other transport channels over multiple frames will ensure that the other transport channels do not overlap with every occurrence of the SCH.

Figure 16:
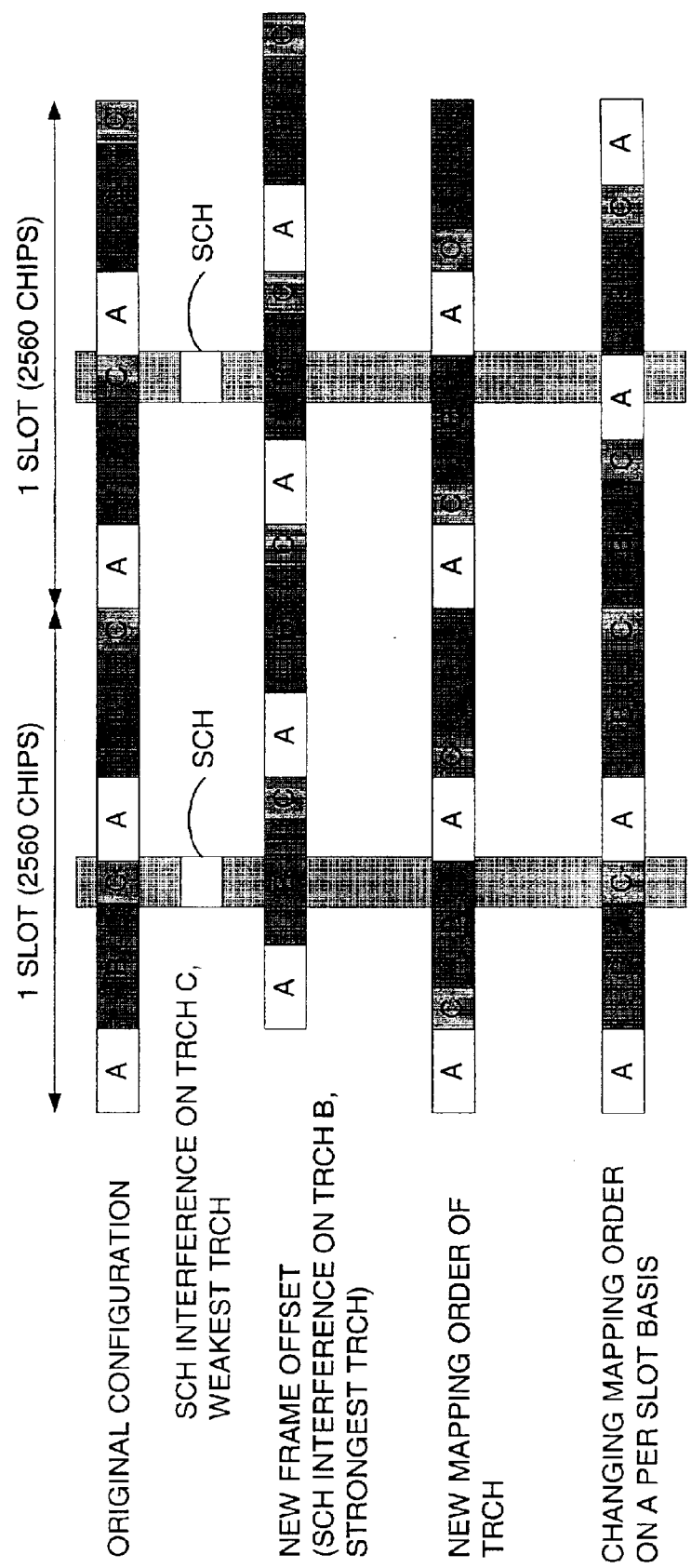
FIG. 16 illustrates in timing diagram form various scenarios for transmission of multiple Transport Channels (TrCHs) on a common physical channel.

FIG. 16 illustrates various solutions for reducing inter-channel interference as detailed herein. The original configuration maintains a predetermined order for the transport channels and applies interleaver portions as a multiple of the number of slots per frame. The interference mechanism is identified as the SCH. The first example illustrates a change in the frame offset, wherein during the SCH occurrence, the transport channel B associated with service B is transmitted. In this way, the SCH has less impact on the transport channel B. In a second example, the transport channels (TrCHs) are mapped differently to reduce the impact of the SCH. In a third example, the mapping of the transport channels is done on a per slot basis.

Non-Periodic Interleaver

As described hereinabove, the SCH interference appears to consistently affect the same transport channel for a given downlink configuration. This is mainly due to the interleaver structure which results in a completely periodic transmission of the transport channels with a periodicity equal to the SCH periodicity.

For example, in the system described hereinabove, the transmissions are defined as 15 slots per frame. See FIG. 2 and discussion thereof. The second interleaver illustrated in FIG. 7 defines the number of columns as a multiple of the number of slots per frame. Specifically, the number of columns is, 30, which is a multiple of 15. Note that the order of the interleaving of the constituent transport channels is constant. Therefore, the periodicity of the interleaved channels is the same as the periodicity of the transmission. Therefore, if a given transport channel has a portion of information (from a column of interleaver) transmitted at the same time as the SCH, then that information will occur concurrently the SCH each time.

An interleaver structure which removes or reduces the consistent periodicity would significantly reduce the effect of the SCH interference on a particular transport channel. The result will be to share the impact of the SCH over all transport channels multiplexed on a same physical channel. Note that this assumes multiple transport channels are mapped onto a common physical channel (which is typically the case). Some example of interleavers which would reduce the intra-frame periodicity of the SCH interference include:

Bit reversed intedeaver.

Block interleaver with number of columns not a multiple of 15.

Any non periodic interleaver.

Weighting Received Transmissions

Prior to decoding, the received symbols are typically scaled and combined with other multi-path components. The scaling factor is usually a function of the common pilot (CPICH) signal-to-noise ratio. Since the SCH increases the noise in a deterministic way, this information can be utilized by the UE to weight the SCH impacted decoder input symbols differently.

Consider the SCH which includes a PSC that repeats every 0.666 . . . ms slot and a SSC that repeats every 10 ms radio frame. Unlike other downlink channels, the PSC and SSC are not scrambled with the downlink scrambling code.

Therefore, at the UE, after de-spreading the incoming signal with the complex conjugate of the downlink scrambling code and de-covering the symbol with the OVSF code, the SNR for each symbol at the decoder input is given as:

$$SNR = \frac{|\alpha|^2 \cdot E_{ct}}{|\alpha|^2 \cdot E_{csch} \cdot \beta + I_{oc}} \cdot SF \text{ wherein}$$

$\alpha$ = Complex fading coefficient $\beta$ = Non-orthogonality factor $SF$ = Spread factor $E_{ct}$ = Energy per chip of transport channel $E_{csch}$ = Energy per chip of SCH $I_{oc}$ = Thermal Noise plus Other Cell Interference power spectral density The non-orthogonality factor varies as a function of both time and the channelization code utilized in the downlink.

Once the UE has acquired the system timing, i.e., "knows" the SCH value and position in time, i.e., time occurrence, the UE is able to determine the weights of the various transmitters. Note that knowledge of the SCH value and time of occurrence implies knowledge of the value of $\beta$ as a function of time for each channelization code. Note specifically, that as the value of $\beta$ increases, the SNR for that symbol degrades further.

The decoder input symbols are typically scaled by the common pilot strength prior to being combined with the symbols from other multi-path components. The UE may then interpret the common pilot strength from each finger as a time-varying weight that is applied to the symbols. Since the UE also knows the value of $\beta$, there are multiple ways of mitigating the effect of the additional interference from SCH. For example, the UE may reduce the weight for each symbol proportionate to the value of $\beta$. This assumes that:

a. The value of $\beta$ is different for the same symbol from different multi-path path components from different Node-Bs.

b. The value of $\beta$ is different for different symbols from the same multi-path component of same Node-B.

In a simpler implementation, the weight could be zero if $\beta$ is greater than a predetermined value, and the default value (pilot strength) otherwise. This is equivalent to assuming an erasure when the value of $\beta$ is greater than a predetermined value.

In a soft handoff (SHO) mode, the symbols may be affected by the SCH from one Node-B (say Node-B-1), and not affected by the SCH from another Node-B (say Node-B-2). In such scenarios, prior to combining the symbols from both Node-Bs, the UE could assign a weight of zero to the symbols impacted symbols from Node-B-1 and assign the default weight to symbols from Node-B-2.

Suppression of Interfering Channel

A UE receiver will process received signals that in general consist of one or more composite signals received from one or more serving Node Bs and interference received from other Node Bs in the network and interference from other sources of interference such as thermal noise. Each of the serving Node Bs transmits one composite signal that contains UE-specific signals for all the served UEs and some shared and overhead signals such as the Common Pilot Channel (CPICH). The composite signal of one particular Node B is received at the UE receiver over a radio channel that introduces in general changes of signal phases and amplitudes. If multiple radio propagation paths exist between the Node B and the UE, reception of multiple echoes of the transmitted composite signal with different phase and amplitude changes for each echo is possible. This effect is commonly referred to as multi-path reception. Each propagation path in a multi-path radio channel can be characterized by a complex channel coefficient and a delay. The channel coefficient defines phase and amplitude changes relative to the transmit signal for a signal component received via that particular propagation path. The delay defines the propagation delay that a signal needs to propagate along the particular propagation path. The different propagation delays of different propagation paths are also referred to as channel taps or delay taps. In the UE receiver, estimates of the delays (or channel taps) and channel coefficients for all relevant propagation paths of all radio channels that the UE receiver intends to use for coherent demodulation—or any other equivalent information that sufficiently characterizes the radio channels such as their complex frequency responses—need to be produced in order to perform coherent demodulation. In general, UE receivers in CDMA systems use a RAKE receiver to perform the coherent demodulation of the signals received over the relevant propagation paths. The RAKE receiver uses the phase, amplitude and delay estimates of each relevant propagation path in order to time align, appropriately phase shift and weight the signals receiver over different propagation paths before combining them to one signal. Besides this coherent demodulation function, a RAKE receiver also performs UE-specific de-spreading of the CDMA signals. Also other receiver architectures such as equalizers are suitable to perform coherent demodulation in CDMA systems.

SCH suppression/cancellation is one method for resolving the interference issues, such as SCH interfering with PC bits (impacts UL power control). In one embodiment, the problem is solved at the UE by identifying the location of the SCH message and canceling the interference to other DL channels caused by the SCH message during those slots during which the SCH message is transmitted.

In $3^{rd}$ Generation CDMA systems specifically, there is the potential for transmission of non-orthogonal signal components wherein other signal components transmitted from the same transmitter are subject to increased interference. For example, when transmitting the time-multiplexed Synchronization Channel (SCH) or when transmitting data using Secondary Scrambling codes in the downlink of Universal Mobile Telecommunications System Terrestrial Radio Access (UTRA) Frequency Division Duplex (FDD) systems, mutual interference between the different signal components results. As discussed hereinabove, under certain conditions, these non-orthogonal signal components cause crucial interference to user or control data transmitted in parallel from the same transmitter. The impact of such interference may be the degradation of decoding performance in the receiver. Such may be the result even in favorable radio conditions (e.g. when no multi-path reception is in effect (i.e., single-path reception), and when only little or no fading occurs). In particular, when the user or control data to be decoded in the receiver are transmitted during a close or same time interval(s) as the non-orthogonal signal components, the decoding performance could be drastically degraded. The interference appears to be dramatic when there is a time-wise overlapping of sufficient information with the interfering signal.

Figure 9:
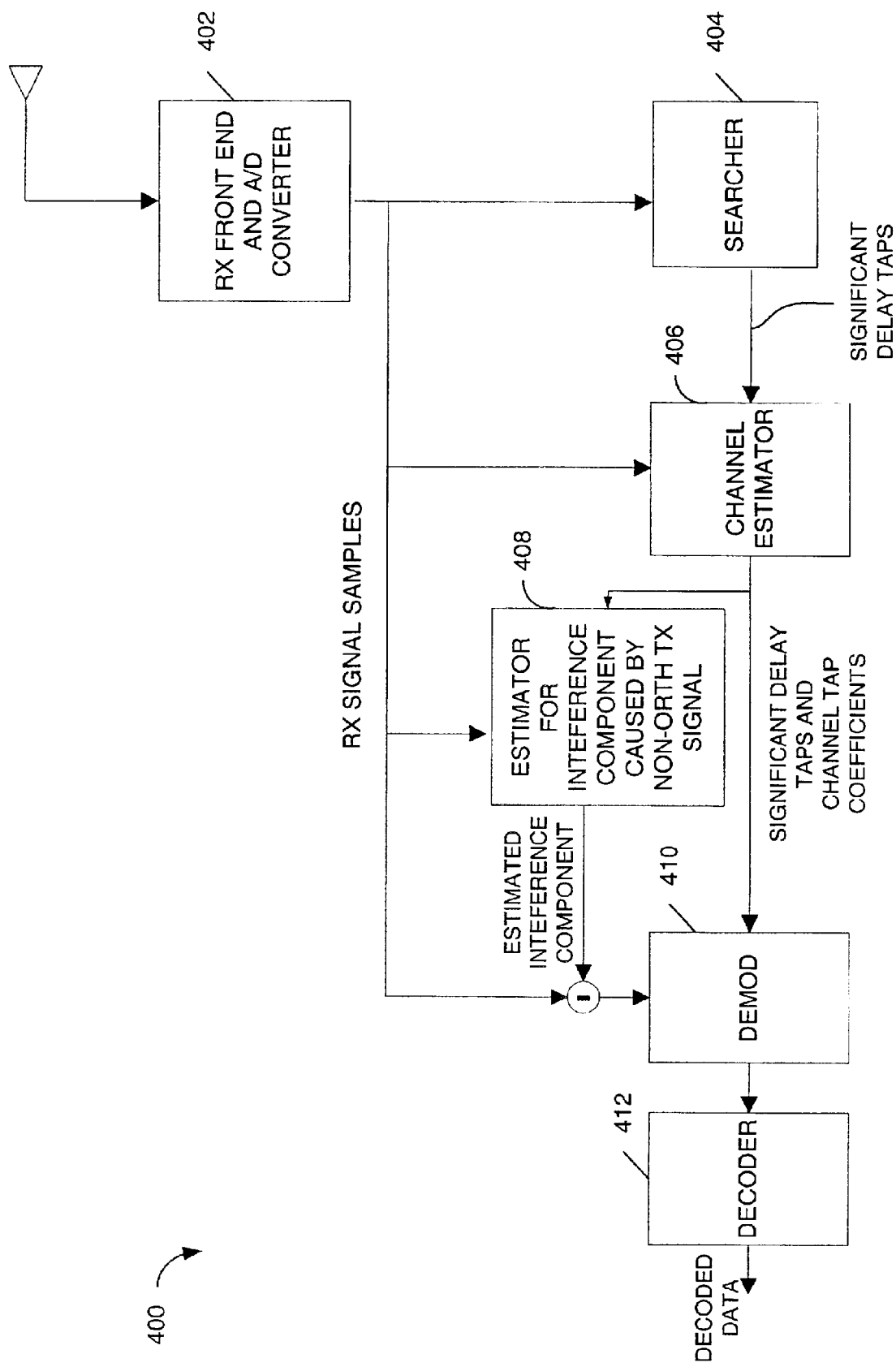
FIGS. 9 and 10 are wireless apparatus for reducing interference.

The impact of the interference may be reduced by canceling the interference component, i.e., non-orthogonal component. One embodiment of an apparatus 400 for suppressing the SCH is illustrated in FIG. 9. The apparatus 400 includes a receiver front end 402 that includes an analog to digital converter, wherein a received signal is first processed by the UE in the receiver front end 402. The unit 402 is coupled to a searcher 404, a channel estimator 406, and an estimator 408 for interference component caused by non-orthogonal transmission signal. The searcher 404 uses a-priori knowledge of transmit signal components such as the Common Pilot Channel (CPICH) in order to provide information on significant delay taps to the channel estimator 406. This can be achieved for instance by using a sliding correlation with a-priori known symbols of the CPICH. The channel estimator 406 continuously outputs significant delay taps and corresponding channel tap coefficients that have been derived for instance by correlation with a-priori known symbols of the CPICH for given delay taps. The channel estimator 406 is coupled to a demodulator 410 which is further coupled to a decoder 412. The output of the estimator 408 is an estimated interference component which is then subtracted from the output of the unit 402. In this way, the interference component, i.e., the power of the interfering channel is subtracted from the received signal. This is prior to demodulation. Note that the apparatus of FIG. 9 corresponds to a RAKE receiver, i.e., diversity receiver.

In operation, the received signal is considered as having a part subject to the interference resulting from the non-orthogonal transmit signal or "interference component." The interference component is estimated. The estimation of this interference component may be done with a sufficient accuracy when the relative strength of the interference component at the transmitter is sufficiently high. For the SCH in a UTRA FDD system, this condition is generally met, wherein −12 dB is a typical power level in comparison to the total transmit power. Furthermore, when the data transmitted with the interference component is known at the receiver, such knowledge may be exploited to improve the quality of the estimated interference component at the receiver.

After the interference component is estimated, the total received signal is modified such that the impact of the interference component is reduced. In an ideal situation this interference component is cancelled. The modified received signal is then used for decoding the transmitted user and/or control data like the unmodified received signal in a conventional receiver. Due to the reduction of interference in the received signal, the decoding performance for the user and/or control data can be improved. In particular, in cases where the user and/or control data contained in a transport block are transmitted in parallel with the non-orthogonal signal component, this decoding improvement may be desirable. Various embodiments may be implemented to mitigate the effect of the interference component.

A first embodiment subtracts an appropriate digital representation of the estimated interference component at the input of each RAKE finger in a RAKE receiver. A second embodiment subtracts an appropriate digital representation of the estimated interference component at the output of each RAKE finger in a RAKE receiver. A third embodiment subtracts a synthesized digital representation of the interference component in the digital domain from the AID converted received signal at the input of a digital receiver. A fourth embodiment subtracts an appropriate digital representation of the estimated interference component at the output of the RAKE finger combiner in a RAKE receiver. The choice which of the four mentioned embodiments is the most efficient solution of the cancellation problem is depending on design factors such as sampling rate at the output of the A/D-converter, sampling rate at the input of the RAKE fingers, bit resolution at the input of the RAKE fingers, bit resolution at the output of the RAKE fingers, bit resolution at the output of the RAKE finger combiner, and others. For instance, if the interference component is cancelled at the output of the A/D-converter, the bit resolution of the estimated interference component is in general rather low, i.e. the accuracy of the estimated interference component does not need to be very high. However, the sampling rate at the output of the A/D-converter is in general much larger than the sampling rate at the input of the RAKE fingers.

As discussed hereinabove, when transmitting the time-multiplexed Synchronization Channel (SCH) in the downlink of UTRA FDD systems, mutual interference between the different transmitted signal components may result. In particular, signals that are intended to serve as a phase reference, e.g. the Common Pilot Channel (CPICH) in UTRA FDD systems, are subject to increased interference due to the non-orthogonal transmission of other downlink signals such as the SCH. Consider pilot signals known a priori by the receiver, such as the CPICH, used to produce phase and/or amplitude estimates of channel coefficients in order to enable coherent demodulation. The quality of the phase and/or amplitude estimates may be degraded when non-orthogonal signal components are transmitted in parallel to the phase reference signal. The degradation of phase and/or amplitude estimates of channel coefficients will result in a degraded demodulation and decoding performance of the receiver.

In order to follow the variations of channel coefficients over time, a receiver employing coherent demodulation updates phase and/or amplitude estimates of channel coefficients continuously. Since the time variations of channel coefficients are limited by the maximum Doppler shift, state of the art implementations of channel estimators use low-pass filtering of consecutive channel estimates in order to improve estimation quality by "averaging" over a reasonable time period. This filtering is also referred to as "Pilot Filtering". The higher the anticipated maximum Doppler shift, the shorter the selected "averaging" interval. In the case of time-multiplexed transmission of non-orthogonal signal components, like the SCH in UTRA FDD systems, the estimation quality of consecutive phase and/or amplitude estimates of channel coefficients will vary depending on the presence and the relative power level of the non-orthogonal signal components. In conventional state of the art receivers, the pilot filtering procedure does not take into account different levels of estimation quality of channel coefficient estimates and uses all generated channel coefficient estimates in the same way, i.e., assuming that the estimation quality of consecutive estimates does not vary.

If the time intervals during which non-orthogonal signal components are transmitted are known a piori, this information may be taken into account to reduce the relevance of channel coefficient estimates generated during such time intervals. This may be accomplished by introducing weighting factors for channel coefficient estimates that are proportional to their respective estimation quality, e.g. in terms of the channel estimation Signal-to-Noise and Interference Ratio (SNIR). In extreme cases, the weighting may be chosen such that the estimates subject to interference from non-orthogonal transmit signals are not used at all (weight factor of zero). As channel coefficient estimates subject to such increased interference are less significant in the pilot filtering process, the resulting channel estimation quality will thereby improve. Even if pilot filtering is not used, the information about the presence of interference due to non-orthogonal transmit signals may be used to skip channel coefficient estimates that were generated in these time intervals and re-use older estimates instead.

As described in the previous paragraph, the information about time intervals in which non-orthogonal signal components are transmitted may be exploited in different ways to reduce channel estimation errors. Various embodiments and implementations include:

Skip channel coefficient estimates that are subject to increased interference due to the presence of non-orthogonal transmit signals and re-use the latest non-affected estimate.

Replace channel coefficient estimates that are subject to increased interference due to the presence of non-orthogonal transmit signals by the average of the previous and the current channel coefficient estimates.

Skip channel coefficient estimates that are subject to increased interference due to the presence of non-orthogonal transmit signals and replace them by the average of the previous and the next channel coefficient estimate.

Weight each channel coefficient estimate at the input of the pilot filter with a factor that is proportional to the SNIR for that estimate.

Weight each channel coefficient estimate at the input of the pilot filter with a factor that is a monotonous increasing function of the SNIR for that estimate.

Note that the embodiments and implementations listed above are not intended to be a complete list, but rather illustrate the variety of methods available to resolve the impact of interference. Specifically, the examples provide methods for exploiting a priori knowledge of interference timing. In the case of the SCH in UTRA FDD or WCDMA systems, the SCH time-intervals are known after the terminal has successfully acquired the slot timing. Therefore, improving channel estimates in the described way is possible in such systems.

Figure 10:
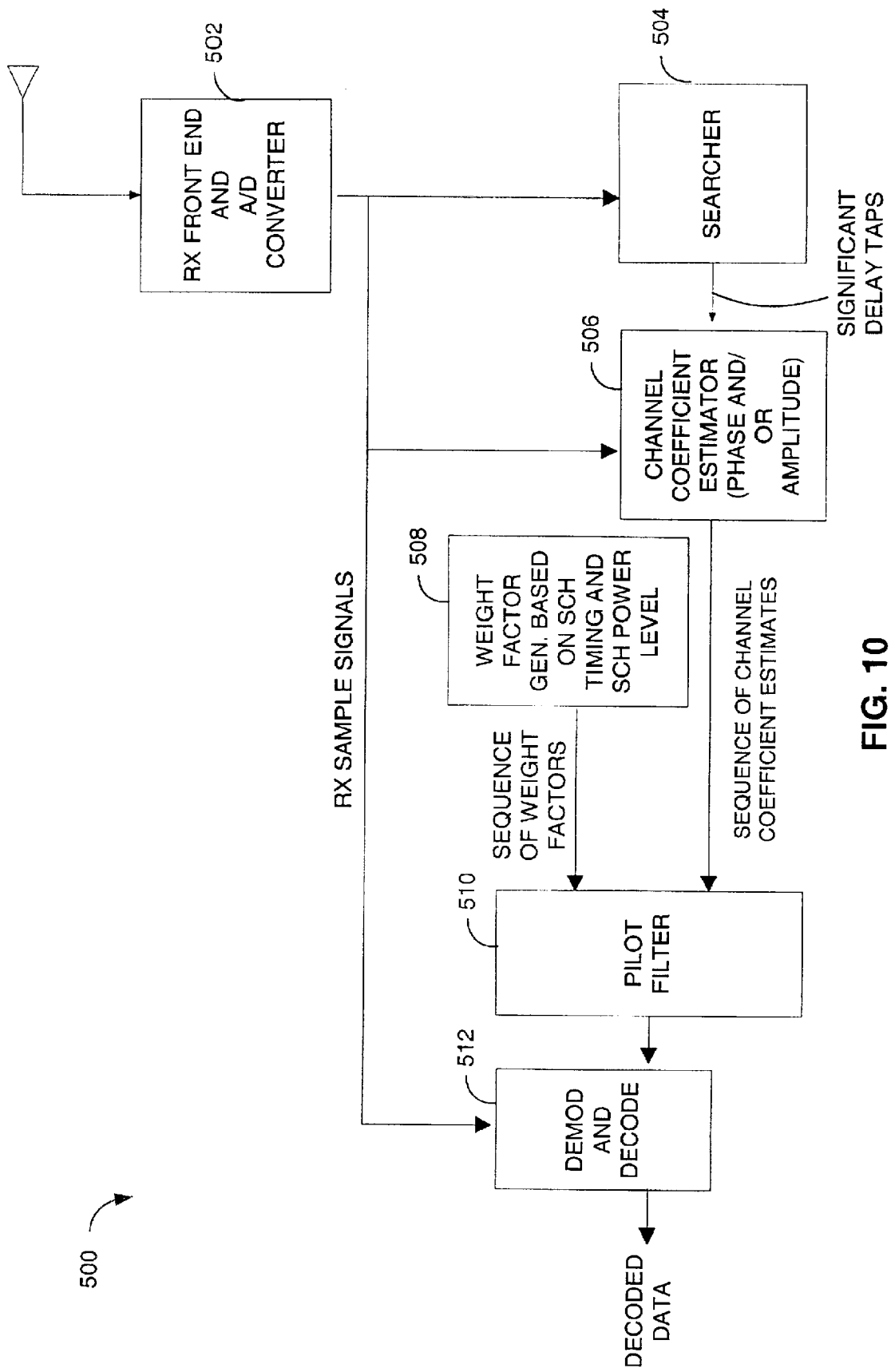

FIG. 10 illustrates an apparatus 500 including a receiver front end 502 which includes an analog to digital converter coupled to a searcher 504, a channel coefficient estimator 506, and a demodulator and decode unit 512. The searcher element 504 uses a-priori knowledge of transmit signal components such as the Common Pilot Channel (CPICH) in order to provide information on significant delay taps to a channel coefficient estimator 506. This can be achieved for instance by using a sliding correlation with a-priori known symbols of the CPICH. The channel coefficient estimator 506 provides a sequence of channel coefficient estimates for one the significant channel taps to a pilot filter 510. A weight factor generator 508 provides a sequence of weighting factors that are specific for each channel coefficient estimate to the pilot filter 510. The weight should represent the quality of each channel coefficient estimate. Estimates for the CPICH pilot symbol SNIR could be used as a metric for the channel estimation quality. The pilot filter uses the weight factors to produce filtered versions of the channel coefficient estimates. The pilot filter is further coupled to demodulator and decode unit 512, which performs coherent demodulation and decoding of the transmitted data. In order to perform coherent demodulation, estimates for the channel coefficients for all significant delay tabs are needed.

The described methods for canceling the interference component and for mitigating the effect of the interference component on the channel estimates can also be combined and/or they could be done iteratively. For example: In a first step, the estimated interference component is subtracted from a digital representation of the received signal as described hereinabove. Then in a second step, the estimation of the channel coefficients could be performed again, but this time based on the signal after the subtraction of the estimated interference component. Due to the subtraction of the estimated interference component, the quality of some channel estimates will become better. This increase channel estimation quality could be taken into account when deriving the weight factors for channel coefficient estimates that are filtered in the pilot filter as described hereinabove. Now a second iteration of interference cancellation could be performed. The output of the pilot filter could be used to derive a new and enhanced estimate of the interference component in the interference estimator. The new and enhanced estimate of the interference component could be subtracted from the original digital representation of the received signal. A second iteration of improved channel estimation could be started. And so on. . . until further iterations do not increase the pilot weight factors any more. Then the latest channel coefficient estimates and the latest interference cancelled received signal are used for coherent demodulation.

Power Boosting at the Transmitter

In 3GPP FDD downlink, the SCH (Synchronization Channel) is transmitted in a non-orthogonal way. As seen by a UE, this implies that other signals transmitted from the same cell/Node-B are subject to additional interference from the SCH. This interference is deterministic in nature, repeating every 10 ms radio frame, thus degrading the received SNR at the terminal. The Node-B can mitigate this effect by increasing the transmit power for all channels, for the duration when SCH is present. This approach can be generalized to any scenario wherein the interference has a deterministic component that the Node-B is aware of.

The SCH comprises of a PSC (Primary Scrambling Code) that repeats every 0.666 . . . ms slot and a SSC (Secondary Scrambling Code) group that repeats every 10 ms radio frame. Unlike other downlink channels, the PSC and SSC are not scrambled with the downlink scrambling code (DSC). Therefore, at the UE, after de-spreading the incoming signal with the complex conjugate of the downlink scrambling code and de-covering with the OVSF code (Orthogonal Variable Spreading Factor code), the SNR for each symbol can be written as:

$$SNR = \frac{|\alpha|^2 \cdot E_{ct}}{|\alpha|^2 \cdot E_{csch} \cdot \beta + I_{oc}} \cdot SF \text{ wherein}$$

$\alpha$ = Complex fading coefficient

-continued $\beta$ = Non-orthogonality factor $SF$ = Spread factor $E_{ct}$ = Energy per chip of transport channel $E_{csch}$ = Energy per chip of SCH $I_{oc}$ = Thermal Noise plus Other Cell Interference power spectral density Essentially, the SCH (when present) degrades the SNR of received symbols. Those terminals close to the Node-B, do not have the luxury of receiving symbols from adjacent Node-Bs. Therefore, proximate terminals are generally not able to use diversity techniques. The non-orthogonality factor is a function of channelization code (OVSF code), DSC, SSC and time (modulo 10 ms). Therefore, the Node-B could unilaterally increase the transmit power of other channels such as DPCH, when the SCH is present. The increase in transmit power could be stored in a look-up table, which is precomputed with the parameters listed above.

Further, the increase in power may be a function of the terminal geometry, which is a measure of downlink C/I. If the terminal geometry is small, the increase in transmit power should be lower as the SCH constitutes a smaller proportion of interference and has negligible effect on received symbol SNR, and vice versa. The non-orthogonality factor varies as a function of time and the channelization code utilized in the downlink.

In one embodiment, the DPCCH includes dedicated pilot bits, uplink Transmit Power Control (TPC) bits and Transport Format Combination Index (TFCI) bits. The dedicated pilot bits are used to compute the downlink SNR. In the inner loop of DLPC (DL Power Control), this SNR is compared to the target SNR, set by the outer loop. If the computed SNR is less than the target SNR, the UE signals to the Node-B to increase the transmit power. The presence of SCH on these bit-locations degrades the SNR estimate. Therefore, the computed SNR at these locations is always lower, resulting in the UE signaling the Node-B to increase the transmit power.

To alleviate this problem, the following power control algorithm at the UE is proposed.

Compute the SNR from the dedicated pilot bits.

Compute the difference between the estimated SNR and the target SNR.

If the difference is greater than zero (estimated SNR is greater than target), signal the Node-B to reduce transmit power.

If the difference is less than zero and less than a threshold, signal the Node-B to increase transmit power.

If the difference is less than zero, but greater than a threshold, signal the Node-B to reduce transmit power.

Among other things, the threshold could be a function of the UE geometry. In a simpler implementation, the threshold could be a constant.

The TPC bits are used to set the uplink transmit power. Any error in estimating the sign of the bits leads to a performance loss on the uplink. Typical TPC bit sign estimation algorithms do not assume a deterministic component in the interference. If the SCH is present at the location of TPC bits, the threshold to determine the sign of the TPC bits needs to be a function of the SCH, channelization (OVSF) code and the downlink scrambling code. The TFCI bits are used to compute the transport format combination on a slot-by-slot basis. The TFCI bits are coded. TFCI coding is detailed in TS 25.211, 25.212 and 25.213.

Once the UE has acquired the system timing, i.e., "knows" the SCH value and location in time, the UE knows the value of $\beta$ as a function of time for each channelization code. As the value of $\beta$ increases, the symbol SNR degrades.

The symbols are typically scaled by the common pilot strength prior to combination with the symbols from other multi-path components for a RAKE receiver. The UE may interpret the common pilot strength from each finger as a time-varying weight applied to the symbols. Since the UE also knows the value of $\beta$ as a function of time and channelization code, there are multiple ways of mitigating the effect of the additional interference from SCH. Note the value of $\beta$ is different for the same symbol from different multi-path components from different Node-Bs; the value of $\beta$ is different for different symbols from the same multi-path component of same Node-B.

Interference: L2 Example

In practice, service providers have observed reliability problems with the transmission of L2 ACK/NACK messages sent on the downlink when operating at high geometries. For this scenario, the SCH transmission results in frequent loss of the ACK/NACK message in the L2 (layer 2). As the ACK/NACK is used to confirm transmissions, the loss disrupts a given communication and may result in the loss of a call. Therefore, the interference with the L2 ACK is an unacceptable problem.

Based on investigation of potential scenarios resulting in the loss of the L2 ACK message, and simulation, the problem appears to result from a number of simultaneous conditions. When said conditions are met simultaneously, the SCH channel has significant impact on the transmission of the L2 ACK/NACK message. Said impact appears to prevent successful and reliable transmission of this message; the impact of losing the L2 ACK/NACK is described in the next section. Note that the inter-channel interference may affect other messages or W-CDMA procedures.

For a given set of circumstances, a message may be particularly sensitive to the SCH interference. This is verified in simulation results. There are a number of techniques and configurations which mitigate the impact of the SCH interference, or other inter-channel interference.

In UMTS the L2 entities (Radio Link Control, RLC) may be configured in three distinct ways:

RLC Transparent Mode, mostly for voice services.

RLC Unacknowledged Mode, for streaming services and some signaling messages.

RLC Acknowledged Mode, for packet services and most of the signaling messages.

The inter-channel interference affects the Acknowledged Mode of L2, as L2 ACK/NACK messages are used for this mode. The SCH transmissions introduce interference to transmission of the ACK/NACK messages in L2. The loss of these messages results in incorrect operation of the system. In one scenario, the L2 ACK/NACK loss is limited to a specific configuration of the MEASUREMENT REPORT message, wherein the MEASUREMENT REPORT message configuration (event 1B, described in TS 25.331, section 14.1.2.2) is used to report that "A primary CPICH leaves the reporting range," i.e. that a radio link should be removed from the active set. The following reconstructs likely cases in which this message maybe lost:

1. The MEASUREMENT REPORT message is transmitted in uplink and not correctly received by the network. If all the subsequent downlink ACK/NACK messages are lost, an RLC reset procedure is triggered. As a result of the RLC reset, the content of the re-transmission buffers at both the UE and the network are flushed, resulting in the loss of all the messages not yet successfully transmitted.

2. The MEASUREMENT REPORT message is in the RLC transmission buffer waiting to be sent for the first time in uplink, and downlink ACK/NACK messages corresponding to previously sent messages are lost. This triggers an RLC reset procedure, during which the contents of the transmission buffers at both the UE and the network are flushed, resulting in the loss of all the messages not yet transmitted.

Once the MEASUREMENT REPORT for event 1B is lost, the network is no longer able to remove from the active set the radio link that triggered event 1B. The network is required to maintain communication to that UE through that radio link. As a result, the network will respond by increasing the radio link Tx power, until synchronization is lost (probably due to the loss of the uplink reception). This will cause a capacity reduction in the cell/sector from which the radio link is transmitted.

The loss of L2 ACK/NACK has a more general impact than the specific problem(s) as described hereinabove. For example, the Radio Resource Control (RRC) protocol relies heavily on the successful delivery of L2 messages. As an example, many RRC procedures are considered terminated in UE when the corresponding RRC message is delivered to the lower layers for transmission. These include:

RRC CONNECTION SETUP COMPLETE
RRC STATUS
SIGNALLING CONNECTION RELEASE INDICATION
COUNTER CHECK RESPONSE
RADIO BEARER SETUP COMPLETE
RADIO BEARER RECONFIGURATION COMPLETE
RADIO BEARER RELEASE COMPLETE
TRANSPORT CHANNEL RECONFIGURATION COMPLETE
PHYSICAL CHANNEL RECONFIGURATION COMPLETE
RADIO BEARER SETUP FAILURE
RADIO BEARER RECONFIGURATION FAILURE
RADIO BEARER RELEASE FAILURE
TRANSPORT FORMAT COMBINATION CONTROL FAILURE
PHYSICAL CHANNEL RECONFIGURATION FAILURE
UTRAN MOBILITY INFORMATION FAILURE
ACTIVE SET UPDATE FAILURE
HANDOVER FROM UTRAN FAILURE
CELL CHANGE ORDER FROM UTRAN FAILURE
MEASUREMENT REPORT.

If L2 ACK/NACK cannot be reliably transmitted, then the message could be lost, leading to a loss of synchronization between the UE and network state machines. In many cases, the loss of synchronization will be unrecoverable, since most of the RRC messages are differential messages, i.e. they convey only information on what has changed with respect to the previous state, not a snapshot of the latest state. As example, the ACTIVE SET UPDATE messages are used to add or remove radio links to/from the active set, without including the current status of the active set. Similarly, the MEASUREMENT CONTROL messages only indicates the changes in the neighbor list, rather than the latest status of the neighbor list.

Whenever there is a reset of the L2 entity used by RRC (RB2, RB3 or RB4), RRC messages can be lost. It the condition leading to the reset of the L2 entity is not temporary, multiple L2 reset procedures will happen until L2 will generate an unrecoverable error. L2 will then inform the RRC state machine, and a message will be sent by the UE to the network requesting the release of the connection. Note generally that this assumes the maximum number of acceptable resets on L2 entities used by RRC is one, even if higher values can be configured. This means that, a single reset of the L2 entity used by RRC would generate an unrecoverable error.

The assumption that L2 may be configured (RLC Acknowledged Mode) to act as a loss-less data transmission layer for RRC messages is one of the pillars on which the whole RRC architecture is based. In fact, according to the RRC protocol, the network should "initiate an RRC connection release procedure" whenever "an unrecoverable error in RB2, RB3 or RB4" is signaled by the mobile station. If networks were implemented according to what is currently specified in the RRC procedure, whenever the problem occurred, the call or packet session would have to be dropped.

The problems created by the loss of L2 ACK/NACK to the RRC protocol results in loss of user data, as in UMTS the RLC Acknowledged mode is also used to transmit user data for packet services. A continuous loss of L2 ACK/NACK would cause continuous resets in the used L2 entities, with a resulting continuous loss of data. This would be perceived by the higher layers and, eventually by the user, as a loss of connectivity, i.e. the data rate would drop to 0 kb/s.

Even if only some L2 resets occur due to the loss of ACK/NACK messages, the resulting loss of data at L2 would cause many L3 retransmissions with a substantial reduction of the data rate as perceived by the application or by the user. In particular, the flow control mechanism used by TCP/IP (slow start) would drastically reduce the data rate whenever some data is lost by the lower layers. The quality of service would then be degraded and the application may terminate the packet session, due to the expiration of timeouts.

Figure 8:
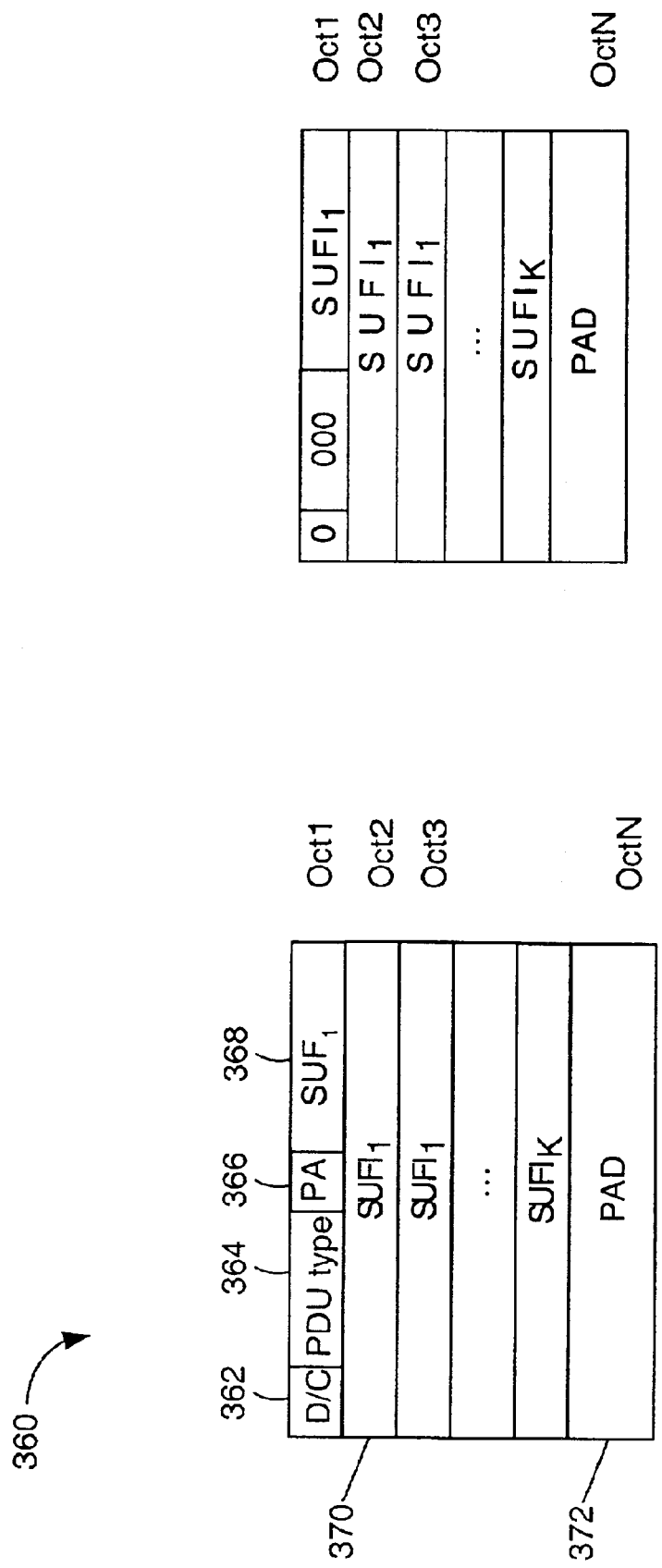
FIG. 8A and FIG. 8B are formats for Protocol Data Units (PDUs) in a W-CDMA system.

In W-CDMA, AM (Acknowledged Mode) L2 (layer 2) control Protocol Data Units (PDUs) have the structure as illustrated in FIG. 8A. The PDU 360 includes several fields. The 1 bit D/C field specifies whether the PDU carries Control (value "0") or data information (value "1"). If the D/C field is set to "0", then the following field is the 3-bit "PDU type" field. This field specifies what kind of control information is carried by this PDU. For release 99, this field can take three possible values, 000, 001 and 010, indicating respectively that the PDU is a STATUS PDU, a RESET PDU or a RESET ACK PDU. RESET and RESET ACK PDUs are only expected to be needed for very extreme circumstances, however STATUS PDUs are essential for the basic RLC protocol to function. The basic format of STATUS PDUs is illustrated in FIG. 8B. In this figure, each SUFI (SUper-FIeld) carries RLC protocol status information.

The AM (Acknowledged Mode) RLC protocol is designed around a Selective Repeat scheme with explicit acknowledgments. In such schemes the reliable transmission of acknowledgements (negative and positive) is central in order to preserve the synchronization of the receive and transmit windows and to avoid stalling. These acknowledgments are sent in the form of SUFIs, as part of status PDUS. In a simplest form, an acknowledgment message would indicate the positive acknowledgment of all the PDUs in the transmitter window up to a certain sequence number. The SUFIs making up this message would be made up of three fields:

1. A four bit field indicating the type of status Super Field (SUFI), which in the case where all the PDUs up to a certain sequence number are being acknowledged, takes value: 0010
2. A twelve bit field 370 indicating the sequence number up to which all the PDUs are positively acknowledged. This may take different values, although always representing the value of a counter, which starts from value 0 when the RRC connection is established.
3. Padding field 372 fills the rest of the PDU 360. The padding value is not specified by the standard and will be discarded by the receiver of the status PDU. However, a general assumption is that the padding is set by default to all 0s by most L2 implementations.

Note that typical PDU sizes are in the order of 150 bits. Therefore, in a message such as the one described above, there would be on the average 7 bits set to 1 and 143 bits set to zero (at least 130 of which would be consecutive). Note also that ciphering, when used, scrambles the data and could therefore alleviate the occurrence of the problem. However, ciphering is not applied to Status PDUs.

Scrambling

The effect of inter-channel interference depends on the sequence of bits that is being transmitted. Some sequences are hit harder than others. The way W-CDMA is specified, the same sequence of bits is sent on the physical layer during transmissions and re-transmissions of the same set of data, even when ciphering is configured. In order to minimize the impact of this problem the system generally desires to: (1) avoid sending some sequence of bits more often than others (e.g. all 0s sequence); and (2) change the pattern sent on the physical layer during re-transmissions of the same set of bits.

A set of solutions are provided below that attempt to achieve (1) and (2). The L2 ACK reliability problem, specifically, is exacerbated due to the long sequence of zeros introduced by the padding. The status PDU can be piggy-backed on a data PDU transmitted on the downlink. This would lead to the introduction of additional (random) bits in the payload, reducing the likelihood of seeing long sequences of all 0s and therefore, avoiding the repetition of specific sequences of bits on the physical layer. The main problem with this solution is that there is not always downlink data to transmit together with the Status PDUs.

Explicit scrambling at RLC level could only be done with a specific scrambling sequence that would be known to both the network and the mobile (potentially negotiated during connection setup). This method would only replace one bit-sequence with another and is therefore not recommended, despite the fact that this method is relatively easy to implement. In the case of scrambling in the MAC, the scrambling could be time-specific (based e.g. on CFN). This would eliminate data-correlated errors, ensuring that the likelihood of successfully completing a certain number of re-transmissions is the same for any data sequence. This would be the best solution in the long term and would achieve both (1) and (2) above, both for ACK/NACK messages and for data PDUs.

The padding field in the message does not need to be set to any specific value by the peer entities since the padding value is ignored by the protocol. The padding value could therefore be mandated to set the bits to some non-zero values (for the network side this does not require any standards changes).

There are again two possibilities in the way this padding would be generated. One would be to pad using the repetition of a specific non-zero octet. The second would be to generate pseudo-random bits for the padding. The latter is the best solution since at least for ACK/NACK messages, this method allows the system to achieve both (1) and (2) given hereinabove. The problem would however still remain for specific higher layer data sequences.

This solution is non-intrusive; both from the standards and from the implementation point of view so, even though not perfect from the user data point of view, this is the preferred solution for the short term.

Interference: Power Control

W-CDMA supports fast downlink power control. In principle if the DCCH is affected by specific interference the power control mechanism should be able to adapt to the environment and adjust the power control loop parameters such that the target DCCH block error rate is met. However this assumes that the power control loop is set up in such a way as to take into account actual DCCH performance.

According to W-CDMA specifications, the system may set-up the power control procedure in such a way as to only monitor the performance of a single transport channel (even when multiple transport channels are multiplexed together). The performance of the other transport channels is controlled through their relative weighting in the rate matching/multiplexing procedure. In 3GPP TS 34.108 all the reference configurations can be configured with or without the possibility to explicitly power control the DCCH.

When the power control procedure is solely driven by the performance of the data channel, any abnormal performance of the DCCH will not be corrected by the power control loop procedure. In particular, if the DCCH experiences some interference which does not affect (or affects to a much lesser extent) the guiding channel (e.g., DTCH), the power control outer loop will not increase the inner loop set-point and the problem will subsist. In one situation, the system does not run an explicit power control outer loop on the DCCH. This is the most severe situation and will result in consistent degradation of the DCCH performance.

When the power control procedure takes into account the DCCH error rate the system should be able to adapt to the condition and carry the signaling messages over the air reliably. However, the power required to overcome the SCH interference may be such as to become impractical or that the power requirement is higher than the power ceiling allowed for a particular RL in the Node-B. Note that this configuration should be considered as a relevant invention to solve the particular problem described herein.

There are a number of conditions which when occurring simultaneously can potentially lead to a significant impact on the link performance and stability; the main source for the problem is the interference associated with the non orthogonal SCH channel. The SCH interference is always present, however, several factors aggravate the inter-channel interference. First, high geometry impacts the affects of inter-channel interference. As discussed hereinabove, the interference is isolated when the UE is proximate the Node-B and therefore, results in loss of information. Second, when the outer loop control mechanism is based on transport channels that are not affected by the SCH. In this case, the power control does not adjust to overcome the impact of the SCH. Third, diversity, including multi-path, transmit-diversity, magnifies the impact. Additionally, when there is no diversity gain on the SCH interference, since 100% correlated except for STTD. This is only a degrading factor if and when the power control outer loop is based on channels which benefit from the diversity. Fourth, when the low rate transport channel is multiplexed with higher rate transport channels. Fifth, messages with long sequences of bits of a same polarity result in a sensitivity to the inter-channel interference.

The L2 ACK case includes all of the aggravated factors. The L2 ACK message is a long sequence of zeros that is mapped onto the DCCH within a higher rate packet configuration. The SCH covers the DCCH bits. The power control set-point is driven by the DCH quality at high geometry.

Interference: AMR Speech Service

The inter-channel interference may create a problem with respect to an Adaptive Multi-Rate (AMR) speech service in W-CDMA thus resulting in an unacceptably high error rate on the DCCH, or radio signal bearer. Note that the AMR speech service is provided as an exemplar; however, the inter-channel interference may have an impact on any of a variety of other services. The high error rate would result in delays to signaling, including signaling related to the handover procedure. In certain situations, this could significantly increase the number of dropped calls. The SNR requirement of the AMR DTCH depends upon the transport format used. Silence frames require much less base station DPCH transmit power than full rate frames. A long period of silence on the downlink will thus cause the base station DPCH transmit power to decrease significantly. The reduced transmit power is insufficient to reliably communicate over the DCCH signaling channel. Since the DCCH channel does not carry a CRC on all transport formats, and therefore, cannot be power controlled. There is no way for the transmitter to know that the error rate on the signaling channel is unacceptably high. Therefore, the transmitter will not know to take corrective action.

A partial solution is to always transmit at least one transport block with zero bit (1×0 format) on the DCCH instead of no data block (0×148 format). The ×0 format includes CRC bits (as opposed to the 0×148 which results in no transmission or DTX) which allows the DCCH to be power-controlled. CRC errors on the DCCH will force the base station to increase the transmit power and future retransmissions will be more likely to succeed.

Note that this is a partial solution as the signaling messages that follow long periods of silence are likely to be delayed due to retransmission. This also does not solve the problem for messages that use Unacknowledged Mode. A better solution to this problem is to use different DPDCH/DPCCH offsets for each transport format combination on the DPCH.

In the W-CDMA system, the voice service is provided with the Adaptive Multi-Rate (AMR) speech service. The AMR source coder generates either a full rate frame, a SID frame, or no data (NULL frame) every 20 ms (i.e. TTI=20 ms). The SID frame is typically sent once every 160 ms during any silence period.

There are many modes for the AMR codec, but the most widely used mode is 12.20 kbps with unequal error protection (UEP). Each of the 244 bits per TTI is divided into 81 class A bits; 103 class B bits; and 60 class C bits. The operation point is to have at most $10\gamma(-4)$ BER for full-rate class A bits or $8.1\times\gamma(-3)$ BLER.

Along with the AMR channels, a DCCH for radio signal bearer messages is multiplexed on the same CCTrCH. The exact level of rate matching is not defined in the Standards. However, based on some published information, the industry accepted guideline is to use the rate matching attributes as indicated in the table of FIG. 11, which indicates the typical coding on AMR/DCCH transport channels.

Based on simulations with close loop power control for different propagation conditions, when full-rate class A bits operate at 0.7% BLER, DCCH BLER is from 2% to 8%. This seems to be reasonable. The problem arises when the same RM attributes are kept for SID and NULL frames. The SNR requirement is much lower for such class A frames, because SID and NULL frames contain much fewer bits than the 81 bits for full-rate frames. The table of FIG. 12 illustrates simulation results of the required SNR's for various transport formats of the Class A and DCCH channels.

Note that an outer loop power control cannot be run off of the DCCH because there is a 0×148 bit transport format on the DCCH, which has no CRC. So during the silence period, when the outer loop is driven off only Class A frames consisting of mostly NULL frames, then a 1×148 frame on the DCCH will be received at about 3.3−0.5=2.8 dB less than required for a BLER of 1%. In the lab, simulations have observed that the actual BLER for DCCH at this low SNR can be up to 60%.

In addition, there is a possibility that ill-chosen offsets for the SCH relative to the data channel results in "collisions" which further raise the DCCH SNR requirement, and thus exacerbates the problem.

Note that the fundamental problem here is the inherently different SNR requirements of Class A NULL frames vs. DCCH signalling frames. Such SNR requirements are a function of the transport block length, the coding, and as well as propagation conditions. Since the UE has no control over these parameters, a good solution would probably have to come from the base station side. (Note one approach is for the UE to always request the necessary power for the weakest channel, e.g., DCCH 1×148. So then Class A frames would always be received at much better than 1% BLER. However this defeats the whole purpose of power control, and is not deemed an acceptable solution.)

It is possible to adjust the rate-matching attributes to equalize the SNR requirements for Class A NULL frames and DCCH 1×148 frames. In this case, the system would desire to increase the repetition on DCCH, while increasing the puncturing on the Class A, B, and C bits to maintain their relative levels of protection.

This approach essentially sacrifices transmit power, since the SNR requirements for Class A, B, and C all go up due to puncturing, for the sake of the DCCH 1×148 frame. This does not seem to be a good trade-off, since the duty cycle of the DCCH is relatively low compared to Class A, B, and C, and so will likely be wasting power most of the time.

Another alternative is to allow the UE to run outer loop power control on the DCCH by using a 1×0 transport format on the DCCH instead of the 0×148 format. With a DCCH outer loop, once the UE detects a block error on the DCCH, the UE will request more power and eventually enough power will be transmitted for the 1×148 to get through.

Transmitting 1×0 instead of 0×148 means that there will always be some transmit power overhead on the DCCH. Furthermore, with this scheme, the first frame in a series of 1×148 frames on the DCCH may always experience a much higher error rate than subsequent frames, before the outer loop target has had the time to "catch up." If there is some acknowledgment/retransmission scheme on the DCCH, this may be acceptable.

Herein, a scheme is presented that may work without transmitting any more power than necessary, and furthermore requires no outer loop "catch-up" delay. This is based on the idea of having the base station apply a variable DPDCH-DPCCH power offset based on the instantaneous transmitted TFC (transport format combination).

Suppose the base station were provided a table of the SNR requirements for all transport formats as in Table 2. Then for all possible TFCs, the base station can compute the overall SNR requirement as the maximum of all the individual SNR requirements, as illustrated in FIG. 13. Every frame, the base station could then adjust the transmit power automatically depending on the TFC which is about to be sent, without waiting for the UE's power control commands.

Conceptually, this divides the transmit power into one component which the base station adjusts through the TFC table (based on transport format, coding, etc.), and another component which the UE adjusts through inner-loop power control (based on instantaneous channel conditions).

For example, suppose there is a silence period, and the base station is transmitting NULL frames (1×0 on Class A), and no signaling (0×148 on DCCH). This corresponds to an SNR of 0.5 dB according to Table 3. At a later time instant, a signaling message 1×148 is multiplexed together with the NULL frame, with a corresponding requirement of 3.3 dB according to Table 3. The base station would automatically apply an additional power of 2.8 dB more than what was used for the no signaling message case, to compensate for the different SNR requirement.

In this scheme, if the UE's inner loop detects that received power has suddenly changed without the UE having sent any corresponding power control commands, the UE will assume that the channel conditions have changed and may try to reverse the power adjustment that the base station provided. This is because the UE must wait until after receiving a frame to have knowledge of the frame's TFC, and hence, to realize that the change in received power was due to the new transport format, and not a change in channel conditions.

To address this problem, according to one embodiment, only the DPDCH transmit power is adjusted per TF, while the DPCCH power is kept constant across TF's. In other words, the base station would transmit the DPCCH at the reference power level, and would adjust the DPDCH power level relative to the DPCCH depending on the transport format. Meanwhile, the DPCCH reference power level is adjusted as usual according to the normal up/down commands as determined by the inner-loop power control.

Figures 14, 15:
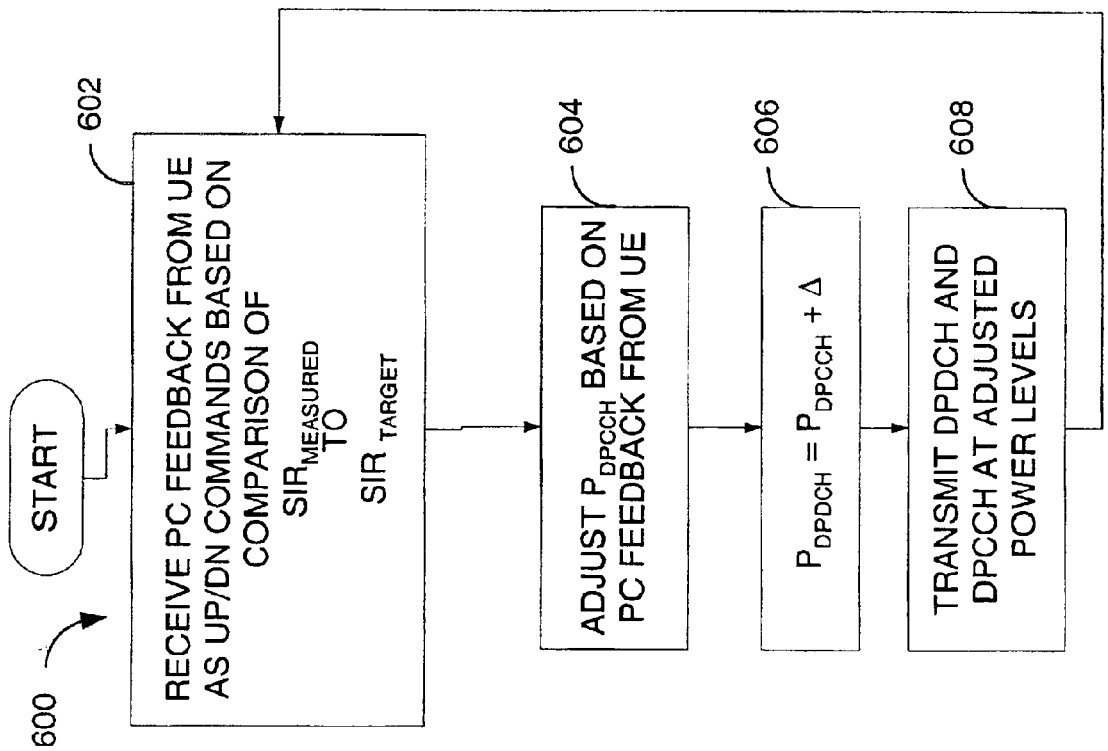
FIG. 14 illustrates a table of power offset values corresponding to TFCS.
FIG. 15 illustrates in flow diagram form a process for mapping TFCs to power offset values.

At the Node-B a table is stored to map the TF combination to a power offset value. An example of such a table is illustrated in FIG. 14. FIG. 15 illustrates a process for power control using a table with the mapping of TF combination to power offset value. The process 600 starts by receiving power control feedback from a UE at step 602. The power control feedback may be in the form of up/down commands. In one embodiment, the command is based on a comparison of a measured signal-to-interference ratio (SIR) to a target SIR. The Node-B adjusts the transmit power of the DPCCH based on the power control feedback from the UE at step 604. The transmit power of the DPDCH is then calculated by applying the power offset to the power of the DPCCH at step 606. The channels are transmitted at step 608.

Note that this approach can easily be generalized to support different BLER targets for each transport format. The base station would simply take each separate BLER target into account in deriving a table of transport-format dependent power offsets.

The key requirement for implementing this approach is the ability for the base station to set the DPDCH-DPCCH power ratio based on the TFC. Also, the exact SNR requirements set forth in Table 2 may vary depending on implementation, or propagation conditions. The more accurate the requirements, the more efficient the system will be, in terms of transmit power. Note that in the case where all SNR requirements are set identically to 0 dB, then this scheme simply reduces to the original scheme of no transmit power offsets.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method in a wireless communication system, comprising:
    formatting messages for transmission in frames having a plurality of slots, wherein each frame has a first number of slots;
    dividing each frame into a second number of portions, wherein the second number of portions is not a multiple of the first number of slots;
    interleaving the plurality of slots in each frame using the second number of portions; and
    transmitting an interleaved frame.

2. The method as in claim 1, wherein the wireless communication system is a Wideband-Code Division-Multiple Access (W-CDMA) system.

3. The method as in claim 1, wherein the interleaving comprises block interleaving.

4. The method as in claim 1, wherein the second number of portions is a dynamic number varying over time.

5. An apparatus in a wireless communication system, comprising:
    means for formatting messages for transmission in frames having a plurality of slots, wherein each frame has a first number of slots;
    means for dividing each frame into a second number of portions, wherein the second number of portions is not a multiple of the first number of slots;
    means for interleaving the plurality of slots in each frame using the second number of portions; and
    means for transmitting an interleaved frame.

6. An apparatus in a wireless communication system, comprising:
    transmitter, and
    processor adapted to:
        format messages for transmission in frames having a plurality of slots, wherein each frame has a first number of slots;
        divide each frame into a second number of portions, wherein the second number of portions is not a multiple of the first number of slots;
        interleave the plurality of slots in each frame using the second number of portions; and
        transmit an interleaved frame.

7. An interleaver, comprising:
    means for dividing a transmission frame having a first number of slots into a second number of portions, wherein the second number of portions is not a multiple of the first number of slots; and
    means for interleaving the first number of slots using the second number of portions.

8. A method in a wireless communication system, comprising:
    formatting messages for transmission in frames having a plurality of slots;
    dividing each frame into a predetermined number of portions;
    interleaving the plurality of slots in each frame, wherein the bits of each slot are reversed; and
    transmitting an interleaved transmission.

9. An apparatus in a wireless communication system, comprising:
    means for formatting messages for transmission in frames having a plurality of slots;
    means for dividing each frame into a predetermined number of portions;
    means for interleaving the plurality of slots in each frame, wherein the bits of each slot are reversed; and
    means for transmitting an interleaved frame.

10. An apparatus in a wireless communication system, comprising:
    transmitter; and
    processor adapted to:
        format messages for transmission in frames having a plurality of slots;
        divide each frame into a predetermined number of portions;
        interleave the plurality of slots in each frame, wherein the bits of each slot are reversed; and
        transmit an interleaved frame.

* * * * *